United States Patent
Wippermann et al.

(10) Patent No.: US 11,457,152 B2
(45) Date of Patent: Sep. 27, 2022

(54) DEVICE FOR IMAGING PARTIAL FIELDS OF VIEW, MULTI-APERTURE IMAGING DEVICE AND METHOD OF PROVIDING SAME

(71) Applicant: Fraunhofer-Gesellschaft zur Förderung der angewandten Forschung e.V., Munich (DE)

(72) Inventors: Frank Wippermann, Meiningen (DE); Andreas Brückner, Gröbenzell (DE); Jacques Duparré, Jena (DE); Alexander Oberdörster, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 45 days.

(21) Appl. No.: 16/585,693

(22) Filed: Sep. 27, 2019

(65) Prior Publication Data
US 2020/0029023 A1    Jan. 23, 2020

Related U.S. Application Data

(63) Continuation of application No. PCT/EP2018/025110, filed on Apr. 11, 2018.

(30) Foreign Application Priority Data

Apr. 13, 2017   (DE) ................... 10 2017 206 442.0

(51) Int. Cl.
*H04N 5/232*   (2006.01)
*G06T 7/11*    (2017.01)
(Continued)

(52) U.S. Cl.
CPC .......... *H04N 5/23296* (2013.01); *G06T 7/11* (2017.01); *H04N 5/2259* (2013.01);
(Continued)

(58) Field of Classification Search
CPC ............ H04N 5/2259; H04N 5/23238; H04N 5/23296; G06T 2207/20212
See application file for complete search history.

(56) References Cited

U.S. PATENT DOCUMENTS

| | | |
|---|---|---|
| 8,953,052 B2 | 2/2015 | Kusaka |
| 9,232,138 B1 | 1/2016 | Baldwin |

(Continued)

FOREIGN PATENT DOCUMENTS

| | | |
|---|---|---|
| CN | 104782113 A | 7/2015 |
| CN | 104935790 A | 9/2015 |

(Continued)

OTHER PUBLICATIONS

European Office Action, dated Sep. 28, 2020, in patent application No. 18724780.4.

(Continued)

*Primary Examiner* — Jeremiah C Hallenbeck-Huber
(74) *Attorney, Agent, or Firm* — McClure, Qualey & Rodack, LLP

(57) ABSTRACT

A device includes an image sensor and an array of optical channels, each optical channel including an optic for projecting a partial field of view of a total field of view onto an image sensor area of the image sensor. A first optical channel of the array is configured to image a first partial field of view of the total field of view. A second optical channel of the array is configured to image a second partial field of view of the total field of view. The device includes a calculating unit configured to obtain image information of the first and second partial fields of view on the basis of the imaged (Continued)

partial fields of view, and to obtain image information of the total field of view, and to combine the image information of the partial fields of view with the image information of the total field of view so as to generate combined image information of the total field of view.

47 Claims, 16 Drawing Sheets

(51) Int. Cl.
  *H04N 5/225* (2006.01)
  *H04N 9/31* (2006.01)
(52) U.S. Cl.
  CPC ....... *H04N 5/2328* (2013.01); *H04N 5/23238* (2013.01); *H04N 9/3188* (2013.01); *G06T 2207/20212* (2013.01)

(56) References Cited

U.S. PATENT DOCUMENTS

| | | | |
|---|---|---|---|
| 10,165,194 B1* | 12/2018 | Baldwin | G06T 5/50 |
| 10,291,852 B2 | 5/2019 | Wippermann et al. | |
| 10,560,617 B2 | 2/2020 | Wippermann et al. | |
| 2005/0084179 A1* | 4/2005 | Hanna | H04N 7/181 382/294 |
| 2007/0182812 A1* | 8/2007 | Ritchey | H04N 5/23238 348/36 |
| 2008/0030592 A1* | 2/2008 | Border | H04N 5/23296 348/218.1 |
| 2008/0158371 A1 | 7/2008 | Trescott | |
| 2009/0122195 A1 | 5/2009 | Van Baar et al. | |
| 2010/0271511 A1 | 10/2010 | Ma et al. | |
| 2010/0328471 A1 | 12/2010 | Boland et al. | |
| 2011/0157381 A1 | 6/2011 | Miyasako | |
| 2012/0098971 A1 | 4/2012 | Hansen et al. | |
| 2012/0169842 A1* | 7/2012 | Chuang | G08B 13/19619 348/39 |
| 2012/0293629 A1* | 11/2012 | Min | G06K 9/00604 348/46 |
| 2013/0010258 A1 | 1/2013 | Utagawa | |
| 2013/0033577 A1 | 2/2013 | Lo | |
| 2013/0210563 A1 | 8/2013 | Hollinger | |
| 2014/0002679 A1 | 1/2014 | Ikeda | |
| 2014/0111650 A1 | 4/2014 | Georgiev et al. | |
| 2014/0114534 A1* | 4/2014 | Zhang | H04N 5/23238 701/42 |
| 2014/0160231 A1* | 6/2014 | Middleton | H04N 5/23238 348/36 |
| 2014/0340543 A1* | 11/2014 | Nakada | H04N 9/09 348/239 |
| 2015/0085174 A1 | 3/2015 | Shabtay et al. | |
| 2015/0160725 A1* | 6/2015 | Lee | A61B 3/113 348/78 |
| 2015/0237257 A1 | 8/2015 | Kang | |
| 2015/0268450 A1 | 9/2015 | Ueno et al. | |
| 2015/0286033 A1 | 10/2015 | Osborne | |
| 2015/0293328 A1 | 10/2015 | Laroia | |
| 2015/0365604 A1 | 12/2015 | Griffith et al. | |
| 2016/0044247 A1* | 2/2016 | Shabtay | H04N 5/2254 348/240.3 |
| 2016/0065934 A1* | 3/2016 | Kaza | H04N 5/2258 348/48 |
| 2016/0173869 A1* | 6/2016 | Wang | G06T 5/50 348/187 |
| 2016/0205380 A1* | 7/2016 | Inoue | H04N 5/23296 348/46 |
| 2016/0255330 A1 | 9/2016 | Wippermann et al. | |
| 2016/0360111 A1 | 12/2016 | Thivent et al. | |
| 2017/0118388 A1 | 4/2017 | Wippermann et al. | |
| 2017/0264825 A1 | 9/2017 | Wippermann et al. | |
| 2017/0324899 A1* | 11/2017 | Ohba | H04N 5/23293 |
| 2018/0012085 A1* | 1/2018 | Blayvas | H04N 13/20 |
| 2018/0061006 A1* | 3/2018 | Lei | G06T 3/0012 |
| 2018/0172945 A1 | 6/2018 | Wippermann et al. | |
| 2018/0176437 A1 | 6/2018 | Wippermann et al. | |
| 2018/0176471 A1 | 6/2018 | Wippermann et al. | |
| 2018/0176472 A1 | 6/2018 | Wippermann et al. | |
| 2018/0176473 A1 | 6/2018 | Wippermann et al. | |
| 2018/0184010 A1* | 6/2018 | Cohen | H04N 5/23216 |
| 2018/0184068 A1 | 6/2018 | Wippermann et al. | |
| 2018/0198963 A1 | 7/2018 | Wippermann et al. | |
| 2018/0218224 A1* | 8/2018 | Olmstead | G08B 13/19643 |
| 2018/0241920 A1 | 8/2018 | Wippermann et al. | |
| 2018/0324334 A1 | 11/2018 | Wippermann et al. | |
| 2019/0011809 A1 | 1/2019 | Wippermann et al. | |
| 2019/0017819 A1* | 1/2019 | Ohara | H04N 5/23296 |
| 2019/0068950 A1 | 2/2019 | Wippermann et al. | |
| 2019/0104242 A1 | 4/2019 | Wippermann et al. | |
| 2019/0394398 A1 | 12/2019 | Wippermann et al. | |

FOREIGN PATENT DOCUMENTS

| | | |
|---|---|---|
| DE | 10 2015 215 836 A1 | 2/2017 |
| DE | 10 2015 215 837 A1 | 2/2017 |
| DE | 10 2015 215 840 A1 | 2/2017 |
| DE | 10 2015 215 841 A1 | 2/2017 |
| DE | 10 2015 215 844 A1 | 2/2017 |
| DE | 10 2015 215 845 A1 | 2/2017 |
| DE | 10 2015 216 140 A1 | 3/2017 |
| EP | 1 931 135 A1 | 6/2008 |
| EP | 2059046 A1 | 5/2009 |
| EP | 2 582 128 A2 | 4/2013 |
| JP | 2009124685 A | 6/2009 |
| JP | 2011139167 A | 7/2011 |
| JP | 2011-212206 A | 10/2011 |
| JP | 2012137749 A | 7/2012 |
| JP | 2013045032 | 3/2013 |
| JP | 2013045032 A | 3/2013 |
| JP | 2014-225843 A | 12/2014 |
| JP | 2015060048 A | 3/2015 |
| JP | 2016-173411 A | 9/2016 |
| JP | 2020-510875 A | 4/2020 |
| TW | 201711443 A | 3/2017 |
| TW | 201711457 A | 3/2017 |
| TW | 201713991 A | 4/2017 |
| WO | 2008020899 A3 | 2/2008 |
| WO | 2014/091986 A1 | 6/2014 |
| WO | 2014091985 A1 | 1/2017 |
| WO | 2017/029329 A1 | 2/2017 |
| WO | 2017029329 A1 | 2/2017 |
| WO | 2017029329 A1 | 2/2017 |
| WO | 2017029375 A1 | 2/2017 |
| WO | 2017/056035 A1 | 4/2017 |

OTHER PUBLICATIONS

Japanese Office Action, dated Nov. 10, 2020, in application No. 2019-555889.
English Translation of Japanese Office Action, dated Nov. 10, 2020, in application No. 2019-555889.
Japanese Office Action, dated Nov. 30, 2020, in application No. 2019-548902.
English Translation of Japanese Office Action, dated Nov. 30, 2020, in application No. 2019-548902.
Office Action, dated Nov. 24, 2020, in the parallel Chinese patent application No. 201880039912.6.
Korean Office Action dated Aug. 24, 2020, in application No. 10-2019-7033460.
English Translation of Korean Office Action dated Aug. 24, 2020, in application No. 10-2019-7033460.
Japanese Office Action, dated Mar. 2, 2021, in the parallel patent application No. 2019-555943 with English Translation.
Indian Office Action, dated Mar. 9, 2021, in the parallel patent application No. 201937035160 with English Translation.
Japanese language office action dated Aug. 3, 2021, issued in application No. JP 2019-548902.
English language translation of office action dated Aug. 3, 2021, issued in application No. JP 2019-548902.
Japanese language office action dated May 31, 2022, issued in application No. JP 2021-052628.

(56) References Cited

OTHER PUBLICATIONS

English language translation of office action dated May 31, 2022, issued in application No. JP 2021-052628 (pp. 1-14 of attachment).
Japanese language office action dated Jul. 15, 2022, issued in application No. JP JP2021-196895.
English language translation of office action dated Jul. 15, 2022, issued in application No. JP JP2021-196895.

* cited by examiner

DEVICE FOR IMAGING PARTIAL FIELDS OF VIEW, MULTI-APERTURE IMAGING DEVICE AND METHOD OF PROVIDING SAME

CROSS-REFERENCES TO RELATED APPLICATIONS

This application is a continuation of copending International Application No. PCT/EP2018/025110, filed Apr. 11, 2018, which is incorporated herein by reference in its entirety, and additionally claims priority from German Application Nos. DE 10 2017 206 442.0, filed Apr. 13, 2017, which is incorporated herein by reference in their entirety.

BACKGROUND OF THE INVENTION

The present invention relates to a device for multi-channel capturing of a total field of view, to a supplementation device for supplementing an existing camera, to a multi-aperture imaging device, and to methods of producing a device and multi-aperture imaging device described herein. The present invention further relates to a symmetric channel arrangement to different fields of view.

Conventional cameras each exhibit an imaging channel which images the entire object field. Other cameras include several imaging channels so as to image the total field of view by several partial fields of view. For correct stitching of images (sowing together and/or joining) for a total field of view having objects which exhibit different distances from the camera, a depth map of the captured total field of view may need to be calculated. If stereoscopic capturing is used for this purpose, a perspective of the (artificial, central) reference camera may need to be synthesized. This may result in occultation or occlusion problems since some objects may be covered up along a line of vision. For outputting a preview and/or a video, image processing, e.g. by means of stitching, may be performed, which requires a large amount of calculation expenditure.

Therefore, what would be desirable is a concept of providing high-qualitative images which do not exhibit the above-mentioned disadvantages.

SUMMARY

According to an embodiment, a device may have: an image sensor; an array of optical channels, each optical channel having an optic for projecting a partial field of view of a total field of view onto an image sensor area of the image sensor, a first optical channel of the array being configured to image a first partial field of view of the total field of view, and a second optical channel of the array being configured to image a second partial field of view of the total field of view; and a calculating unit configured to acquire image information of the first and second partial fields of view on the basis of the imaged partial fields of view, and to acquire image information of the total field of view, and to combine the image information of the partial fields of view with the image information of the total field of view so as to generate combined image information of the total field of view; wherein the device is configured to acquire the image information of the total field of view having a first degree of scanning, to acquire the image information of the first or second partial field of view having a second degree of scanning, which is larger than the first degree of scanning, and to provide the combined image information of the total field of view having a third degree of scanning larger than the first degree of scanning; or wherein the calculating unit is configured to subdivide the image information of the total field of view and the image information of the partial fields of view into image blocks and to associate, block by block, image information, which is contained within a first image block of the total field of view, with matching image information of a second image block of the first or second partial fields of view so as to increase, by combining the first and second image blocks, a degree of scanning of the image information of the total field of view in the combined image information.

According to another embodiment, a supplementation device may have an inventive device and be configured to be coupled to a camera so as to acquire therefrom the image information of the total field of view.

According to another embodiment, a multi-aperture imaging device may have: an image sensor; and an array of optical channels, each optical channel having an optic for projecting at least one partial field of view of a total field of view onto an image sensor area of the image sensor; a first optical channel of the array being configured to image a first partial field of view of the total field of view, a second optical channel of the array being configured to image a second partial field of view of the total field of view, and a third optical channel being configured to fully image the total field of view; wherein the device has a calculating unit configured to acquire image information of the first and second partial fields of view on the basis of the imaged partial fields of view, and to acquire image information of the total field of view on the basis of the imaged total field of view, and to combine the image information of the partial fields of view with the image information of the total field of view so as to generate combined image information of the total field of view; and the calculating unit is configured to subdivide the image information of the total field of view and the image information of the partial fields of view into image blocks and to associate, block by block, image information, which is contained within a first image block of the total field of view, with matching image information of a second image block of the first or second partial fields of view so as to increase, by combining the first and second image blocks, a degree of scanning of the image information of the total field of view in the combined image information; or wherein the device is configured to acquire image information of the total field of view having a first degree of scanning from the sensor, to acquire the image information of the first or second partial field of view having a second degree of scanning, which is larger than the first degree of scanning, from the sensor, and to provide the combined image information of the total field of view having a third degree of scanning larger than the first degree of scanning.

According to another embodiment, a multi-aperture imaging device may have: an image sensor; and an array of optical channels, each optical channel having an optic for projecting at least one partial field of view of a total field of view onto an image sensor area of the image sensor; a first optical channel of the array being configured to image a first partial field of view of the total field of view, a second optical channel of the array being configured to image a second partial field of view of the total field of view, and a third optical channel being configured to fully image the total field of view; wherein an image format of the total field of view corresponds to a redundancy-free combination of the imaged first partial field of view and the imaged second partial field of view.

According to another embodiment, a method of providing a device may have the steps of: providing an image sensor;

arranging an array of optical channels, so that each optical channel has an optic for projecting at least one partial field of view of a total field of view onto an image sensor area of the image sensor, so that a first optical channel of the array is configured to image a first partial field of view of the total field of view, and so that a second optical channel of the array is configured to image a second partial field of view of the total field of view; and arranging a calculating unit such that same is configured to acquire image information of the first and second partial fields of view on the basis of the imaged partial fields of view and to acquire image information of the total field of view and to combine the image information of the partial fields of view with the image information of the total field of view so as to generate combined image information of the total field of view; and such that the device is configured to acquire the image information of the total field of view having a first degree of scanning, to acquire the image information of the first or second partial field of view having a second degree of scanning, which is larger than the first degree of scanning, and to provide the combined image information of the total field of view having a third degree of scanning larger than the first degree of scanning; or such that the calculating unit is configured to subdivide the image information of the total field of view and the image information of the partial fields of view into image blocks and to associate, block by block, image information, which is contained within a first image block of the total field of view, with matching image information of a second image block of the first or second partial fields of view so as to increase, by combining the first and second image blocks, a degree of scanning of the image information of the total field of view in the combined image information.

According to another embodiment, a method of providing a multi-aperture imaging device may have the steps of: providing an image sensor; and arranging an array of optical channels, so that each optical channel has an optic for projecting at least one partial field of view of a total field of view onto an image sensor area of the image sensor, and so that a first optical channel of the array is configured to image a first partial field of view of the total field of view, so that a second optical channel of the array is configured to image a second partial field of view of the total field of view, and so that a third optical channel is configured to fully image the total field of view; such that the device has a calculating unit configured to acquire image information of the first and second partial fields of view on the basis of the imaged partial fields of view, and to acquire image information of the total field of view on the basis of the imaged total field of view, and to combine the image information of the partial fields of view with the image information of the total field of view so as to generate combined image information of the total field of view; and the calculating unit is configured to subdivide the image information of the total field of view and the image information of the partial fields of view into image blocks and to associate, block by block, image information, which is contained within a first image block of the total field of view, with matching image information of a second image block of the first or second partial fields of view so as to increase, by combining the first and second image blocks, a degree of scanning of the image information of the total field of view in the combined image information; or such that the device is configured to acquire image information of the total field of view having a first degree of scanning from the sensor, to acquire the image information of the first or second partial field of view having a second degree of scanning, which is larger than the first degree of scanning, from the sensor, and to provide the combined image information of the total field of view having a third degree of scanning larger than the first degree of scanning.

According to another embodiment, a method of providing a multi-aperture imaging device may have the steps of: providing an image sensor; and arranging an array of optical channels, so that each optical channel has an optic for projecting at least one partial field of view of a total field of view onto an image sensor area of the image sensor, and so that a first optical channel of the array is configured to image a first partial field of view of the total field of view, so that a second optical channel of the array is configured to image a second partial field of view of the total field of view, and so that a third optical channel is configured to fully image the total field of view; such that an image format of the total field of view corresponds to a redundancy-free combination of the imaged first partial field of view and the imaged second partial field of view.

A finding of the present invention consists in having recognized that the above object can be achieved in that image information, e.g. a resolution of a total field of view, may be increased by combining same with image information of partial fields of view of the same total field of view, that, however, the image information of the total field of view is already present as, and may be used as, coarse information, and that the occurrence of occultation artifacts may be avoided by using the overall image information.

In accordance with an embodiment, a device includes an image sensor and an array of optical channels. Each optical channel includes an optic for projecting (imaging) a partial field of view of a total field of view onto an image sensor area of the image sensor. A first optical channel of the array is configured to image a first partial field of view of the total field of view, and a second optical channel of the array is configured to image a second partial field of view of the total field of view. The device includes a calculating unit configured to obtain image information of the first and second partial fields of view on the basis of the imaged partial fields of view. The calculating unit is further configured to obtain image information of the total field of view, e.g. from a further device, and to combine the image information of the partial fields of view with the image information of the total field of view so as to generate combined image information of the total field of view. By combining the image information of the partial fields of view and of the total field of view, one obtains high-quality combined image information since there is a large amount of image information. In addition, the image information of the total field of view enables exerting an influence at a small amount of preprocessing expenditure since it may be displayed to a user without partial images having to be stitched.

In accordance with a further embodiment, a supplementation device includes such a device and is configured to be coupled to a camera so as to obtain therefrom the image information of the total field of view. This enables supplementing already existing cameras, which may possibly be mono-cameras, by additionally imaging the partial fields of view, so that high-quality combined image information of the total field of view is obtained. At the same time, the image of the camera may be utilized for exerting an influence on image processing since the information regarding the total field of view already exists at least in a coarse manner.

In accordance with a further embodiment, a multi-aperture imaging device includes an image sensor, an array of optical channels, each optical channel including an optic for projecting at least one partial field of view of a total field of view onto an image sensor area of the image sensor. A first optical channel of the array is configured to image a first partial field of view of the total field of view, a second optical channel of the array being configured to image a second partial field of view of the total field of view, and a third optical channel being configured to fully image the total field of view. This enables both obtaining image information regarding the total field of view and, additionally, obtaining image information regarding the partial fields of view of the same total field of view, so that image areas of the partial fields of view are scanned several times, which enables, e.g., a stereoscopically generated depth map and, thus, high-quality image generation. At the same time, there is the information regarding the total field of view in addition to the information regarding the partial fields of view, which enables the user to exert an influence without any previous image processing having been performed.

Further embodiments relate to a method of producing a device for multi-channel capturing of a total field of view and to a device for providing a multi-aperture imaging device.

The embodiments mentioned enable avoiding or reducing occultation since the main line of vision of image of the total field of view and of the combined image information of the total field of view is unchanged and is supplemented by the images of the partial fields of view.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
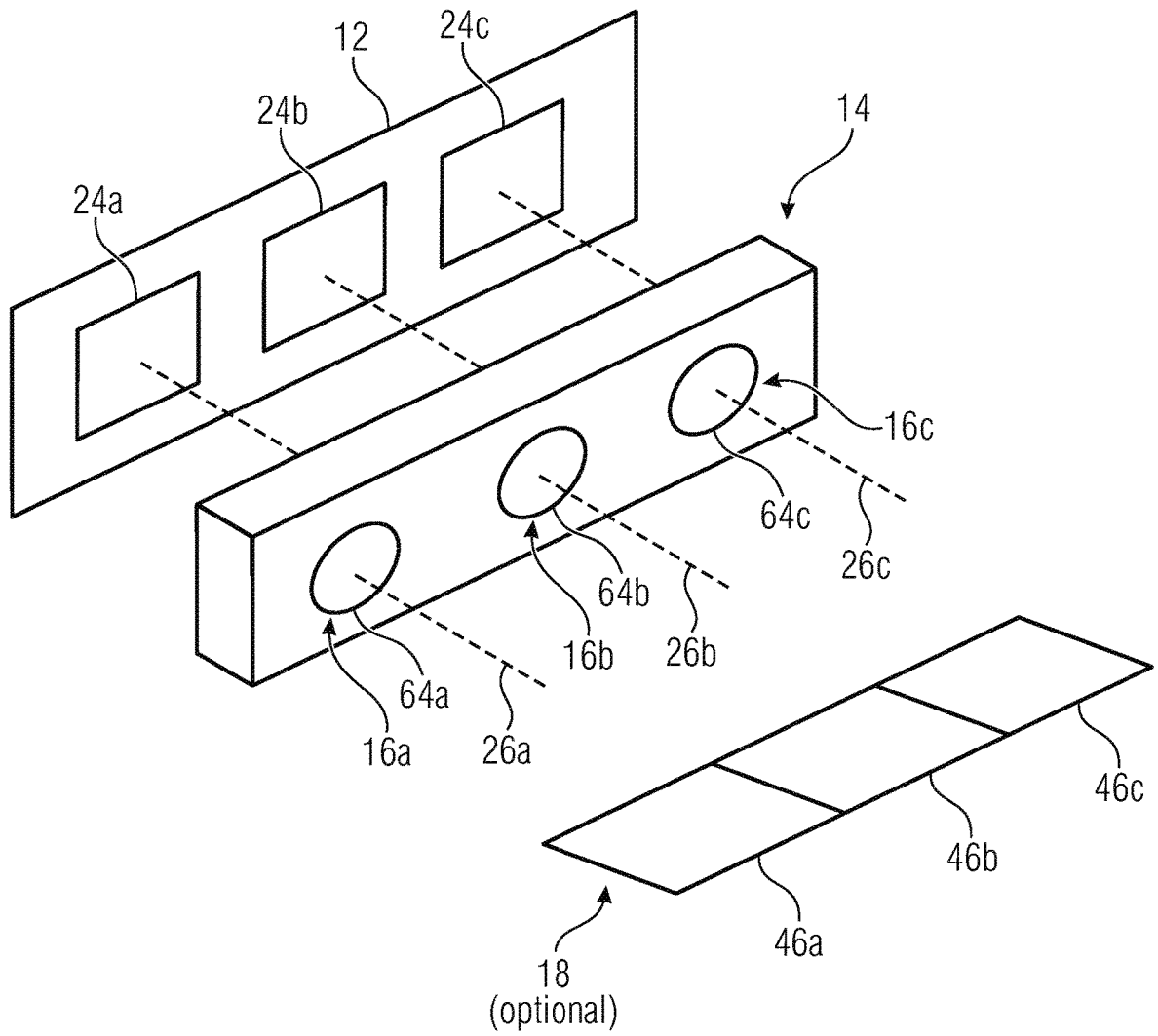
FIG. 1 shows a schematic perspective view of a multi-aperture imaging device in accordance with an embodiment.

Before embodiments of the present invention will be explained in more detail with reference to the drawings, it shall be noted that elements, objects and/or structures which are identical, identical in function or identical in action have been provided with identical reference numerals in the different figures, so that the descriptions of said elements which have been presented in the different embodiments are interchangeable and/or are mutually applicable.

FIG. 1 shows a schematic perspective view of a multi-aperture imaging device 10 in accordance with an embodiment. The multi-aperture imaging device 10 includes an image sensor 12 comprising a plurality of image sensor areas 24a-c. The image sensor 12 may be implemented such that the image sensor areas 24a-c are part of a shared chip, but alternatively, it may also comprise several components, which means that the image sensor areas 24a-c may be arranged on different chips. Alternatively or additionally, the image sensor areas 24a and 24c located opposite the image sensor area 24b, and/or the image sensor area 24a located opposite the image sensor area 24b may have different sizes in terms of the sensor surface and/or different numbers and/or sizes of pixels.

The multi-aperture imaging device 10 further includes an array 14 of optical channels 16a-c. Each of the optical channels 16a-c includes an optic 64a-c for projecting at least a partial field of view of a total field of view or of an object area onto an image sensor area 24a-c of the image sensor 12. One of the optics 64a-c is associated with one of the image sensor areas 24a-c, respectively, and is configured to influence an optical path 26a-c, e.g. by means of concentration or scattering, so that the respective partial field of view or total field of view is projected onto the image sensor area 24a-c. The optics 64a-c may be arranged on a shared carrier so as to form the array 14, but they may also be mechanically connected to one another in a different manner or may not be in mechanical contact. Properties of the optical channels such as length, extension perpendicular to the optical axis or the like, and/or properties of the optics, e.g. focal length, f-number, aperture diameter, aberration correction or physical dimension may vary among the optical channels 16a, 16b and/or 16c and may differ from one another.

Two of the optical channels 16a-c are configured to project one partial field of view onto the associated image sensor area 24a-c, respectively. Projecting (imaging) of a partial field of view here means that the total field of view is imaged in an incomplete manner. A further optical channel of the optical channels 16a-c is configured to fully image the total field of view. The multi-aperture imaging device 10 is implemented, for example, such that the optical channel 16b is configured to fully capture the total field of view. The optical channels 16a and 16c are configured, for example, to capture such partial fields of view of the total field of view which overlap each other in an incomplete manner at the most or which are arranged in a mutually disjoint manner. This means that the arrangement of the optics 64a and 64c for capturing the first and second partial fields of view in the array 14 may be symmetric in relation to the optic 64b for capturing the imaging of the total field of view and/or that the arrangement of the image sensor areas 24a and 24c for imaging the first and second partial fields of view may be symmetric in relation to a location of the image sensor area 24b for imaging the total field of view. Even though any other associations between fields of view, optics and image sensor areas are also possible, the symmetric arrangement, in particular, offers the advantage that additional capturing of the partial fields of view enables symmetric disparity with regard to the central field of vision, i.e. of capturing the total field of view.

The multi-aperture imaging device 10 may comprise optional beam-deflecting means 18 including, in turn, beam-deflecting areas 46a-c, the beam-deflecting means 18 being configured to deflect, with each of the beam-deflecting areas 46a-c, an optical path 26a-c. The beam-deflecting means 18 may include a mirror surface comprising the beam-deflecting areas 46a-c. Alternatively, at least two of the beam-deflecting areas 46a-c may be mutually tilted and form a plurality of mirror surfaces.

Alternatively or additionally, the beam-deflecting means 18 may comprise a plurality or multitude of facets. Utilization of the beam-deflecting means 18 may be advantageous if the field of view to be captured is located in a direction of the multi-aperture imaging device 10 which differs from the line of vision between the image sensor 12 and the array 14. Alternatively, if the beam-deflecting means 18 is not present, the total field of view may be captured along the line of vision of the multi-aperture imaging device 10 and/or the direction between the image sensor 12 and the array 14 and beyond. Arranging the beam-deflecting means 18, however, may enable changing of the line of vision of the multi-aperture imaging device 10 by moving the beam-deflecting means 18 in a translational and/or rotational manner, without having to change the spatial orientation of the image sensor 12 and/or of the array 14 for this purpose.

Figure 2A:
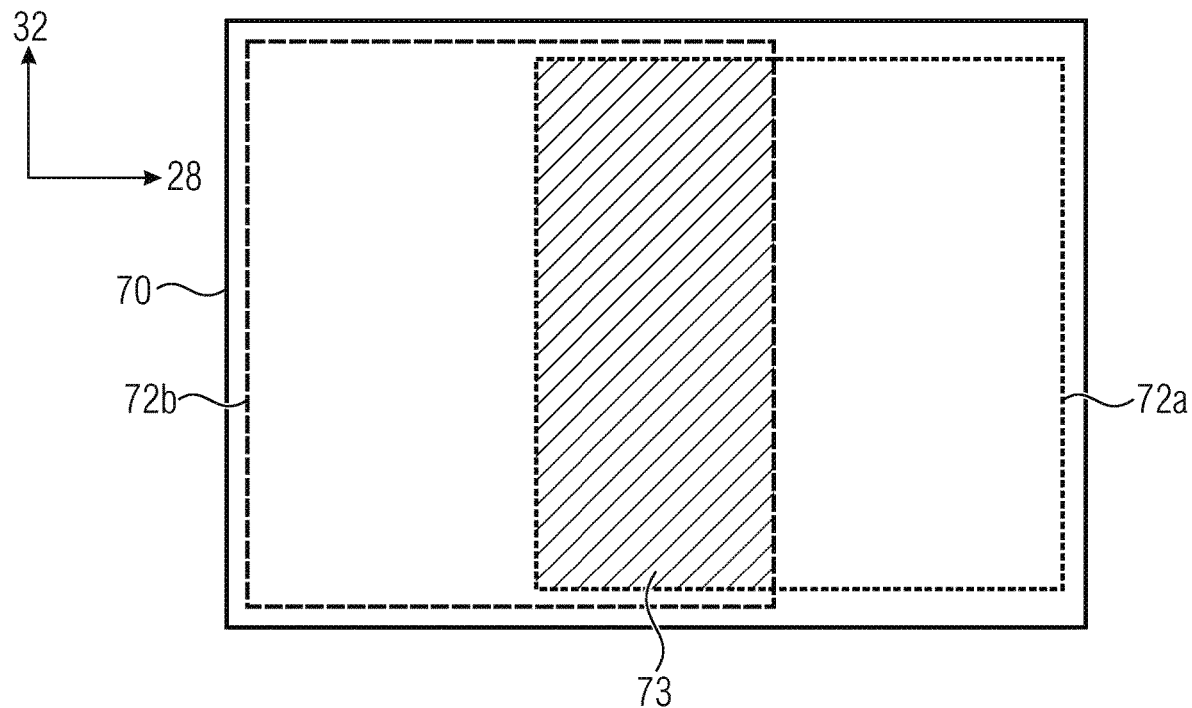
FIG. 2a-c show schematic representations of arrangements of partial fields of view within a total field of view, in accordance with an embodiment.

FIG. 2a shows a schematic representation of an arrangement of partial fields of view 72a and 72b within a total field of view 70, which may be captured, e.g., by the multi-aperture imaging device 10. For example, the total field of view 70 may be projected, by using the optical channel 16b, onto the image sensor area 24b. For example, the optical channel 16a may be configured to capture the partial field of view 72a and to project it onto the image sensor area 24a. The optical channel 16c may be configured to capture the partial field of view 72b and to project it onto the image sensor area 24c. This means that a group of optical channels may be configured to capture precisely two partial fields of view 72a and 72b.

Even though the partial fields of view 72a and 72b are depicted to have different extensions in order to improve distinguishability, they may have identical or comparable extensions along at least an image direction 28 or 32, e.g. along the image direction 32. The extension of the partial fields of view 72a and 72b may be identical with the extension of the total field of view 70 along the image direction 32. This means that the partial fields of view 72a and 72b may fully capture the total field of view 70 along the image direction 32 and may capture the total field of view in an only partial manner along a different image direction 28 arranged perpendicularly to the former, and may be arranged to be offset from one another, so that complete capturing of the total field of view 70 also results along the second direction by means of combination. Here, the partial fields of view 72a and 72b may be disjoint in relation to one another or may overlap in an incomplete manner, at the most, in an overlap area 73, which possibly fully extends along the image direction 32 in the total field of view 70. A group of optical channels including the optical channels 16a and 16c may be configured to fully image the total field of view 70 when combined. The image direction 28 may be a horizontal, e.g., of an image to be provided. In simplified terms, the image directions 28 and 32 represent two different image directions which are spatially arranged in any manner desired.

Figure 2B:
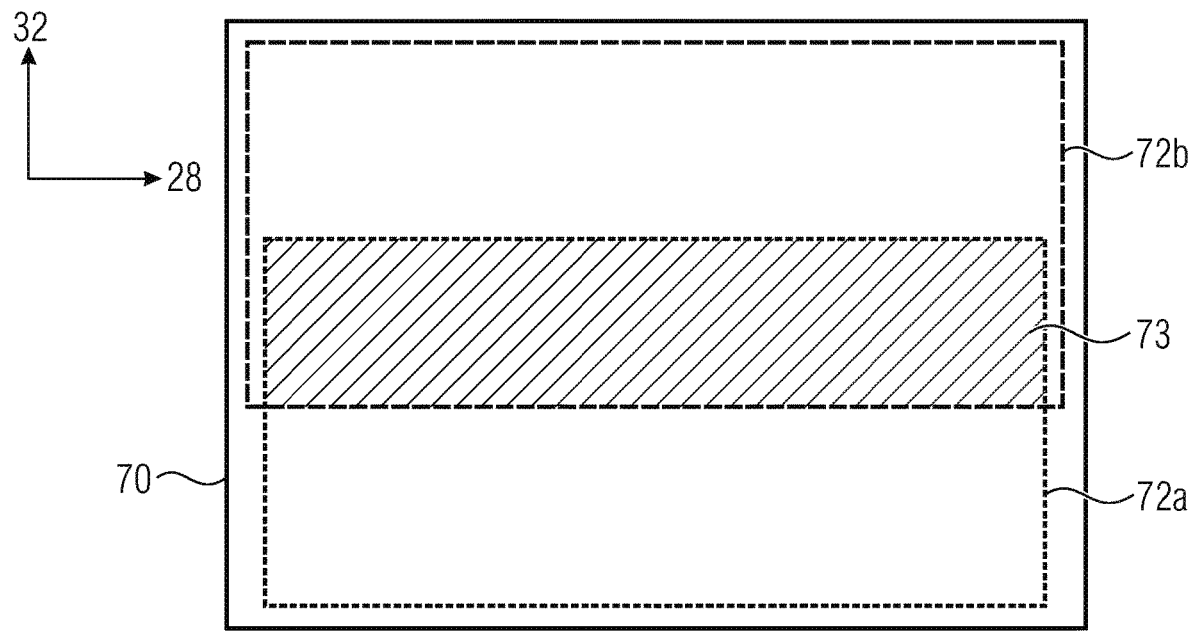

FIG. 2b shows a schematic representation of an arrangement of the partial fields of view 72a and 72b, which are arranged to be mutually offset along a different image direction, namely the image direction 32, and which mutually overlap. The partial fields of view 72a and 72b may fully capture the total field of view 70 along the image direction 28, and in an incomplete manner along the image direction 32, respectively. The overlap area 73 is fully arranged, e.g., within the total field of view 70 along the image direction 28.

Figure 2C:
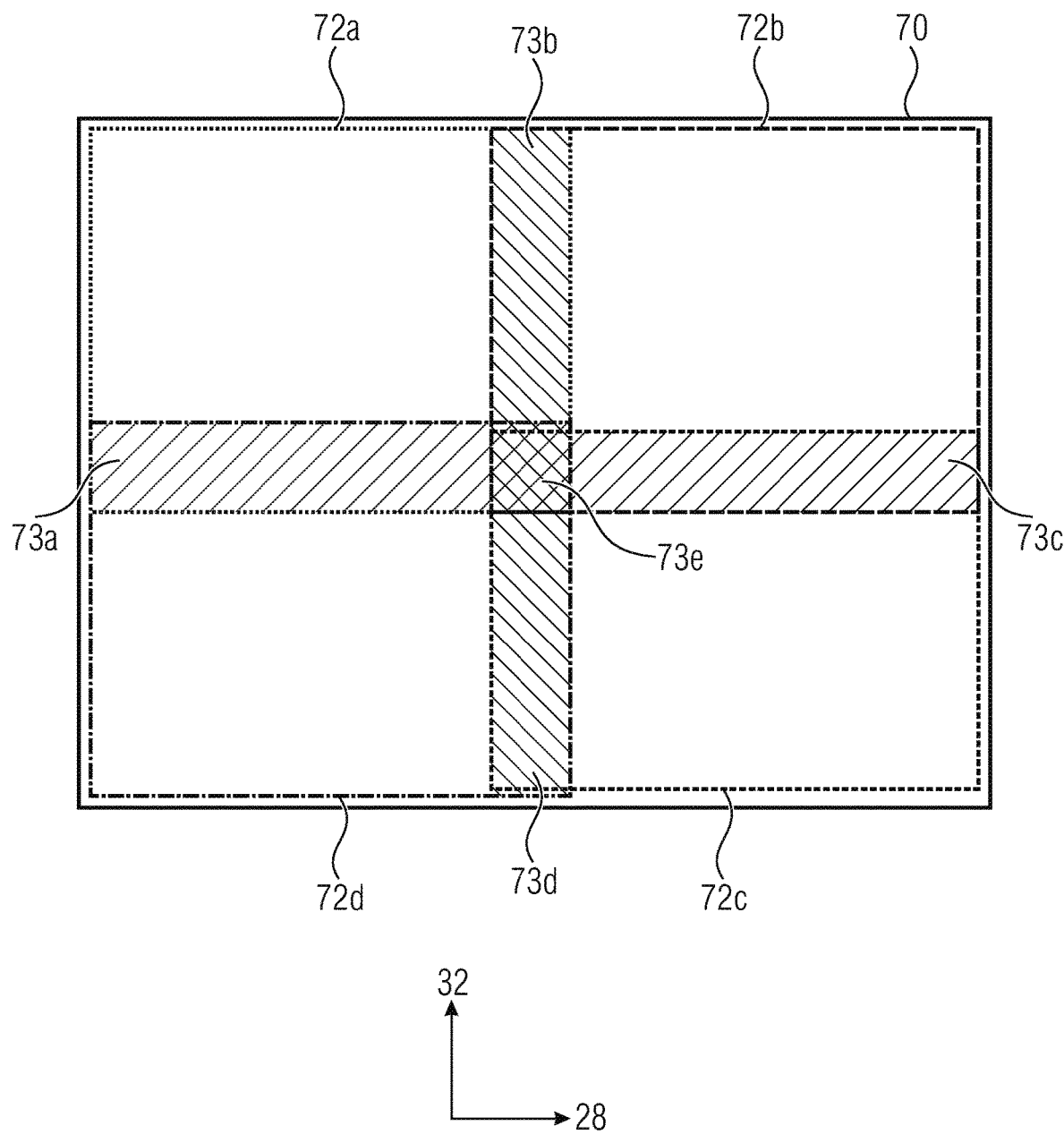

FIG. 2c shows a schematic representation of four partial fields of view 72a to 72d, which capture the total field of view 70 in an incomplete manner in both directions 28 and 32, respectively. Two adjacent partial fields of view 72a and 72b overlap in an overlap area 73b. Two overlapping partial fields of view 72b and 72c overlap in an overlap area 73c. Similarly, partial fields of view 72c and 72d overlap in an overlap area 73d, and the partial field of view 72d overlaps with the partial field of view 72a in an overlap area 73a. All four partial fields of view 72a to 72d may overlap in an overlap area 73e of the total field of view 70.

For capturing the total field of view 70 and the partial fields of view 72a-d, a multi-aperture imaging device may be configured similarly to what was described in the context of FIG. 1, wherein the array 14 may comprise, e.g., five optics, four for capturing partial fields of view 72a-d, and one optic for capturing the total field of view 70.

A large number of image information items are available in the overlap areas 73a to 73e. For example, the overlap area 73b is captured via the total field of view 70, the partial field of view 72a and the partial field of view 72b. An image format of the total field of view may correspond to a redundancy-free combination of the imaged partial fields of view, e.g., partial fields of view 72a-d in FIG. 2c, in which context the overlap areas 73a-e are counted only once in each case. In connection with FIGS. 2a and 2b, this applies to redundancy-free combination of the partial fields of view 72a and 72b. An overlap in overlap areas 73 and/or 73a-e may include, for example, 50% at the most, 35% at the most, or 20% at the most of the respective partial images.

Figure 3:
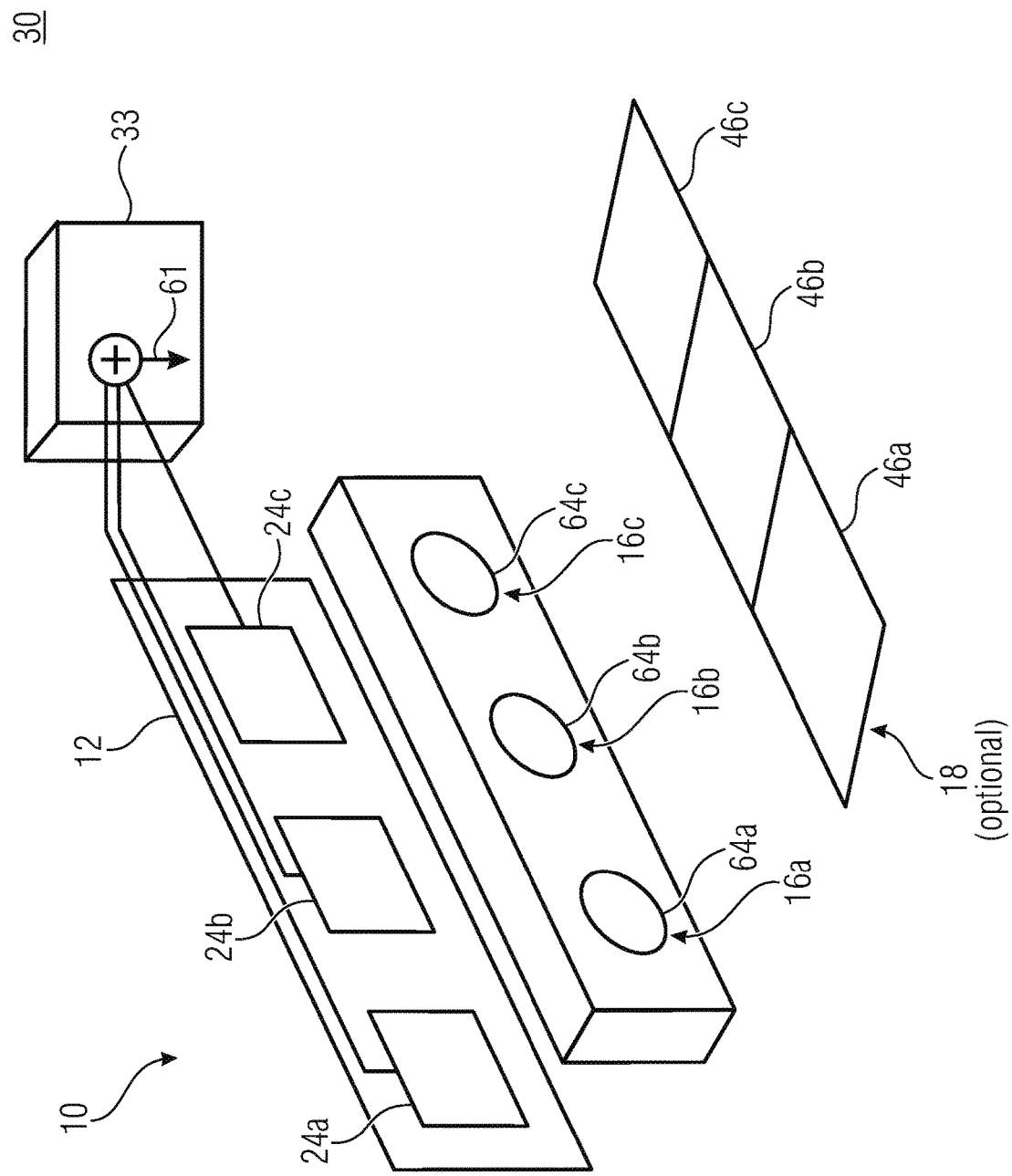
FIG. 3 shows a schematic perspective representation of a multi-aperture imaging device, comprising a calculation unit, in accordance with an embodiment.

FIG. 3 shows a schematic perspective representation of a multi-aperture imaging device 30 in accordance with a further embodiment, which expands the multi-aperture imaging device 10 by a calculating unit 33.

The calculating unit 33 is configured to obtain image information from the image sensor 12, which means image information regarding the partial fields of view, e.g., partial fields of view 72a and 72b, which have been projected onto the image sensor areas 24a and 24c, as well as image information of the total field of view, e.g., the total field of view 70, which may be projected onto the image sensor area 24b. The calculating unit 33 is configured to combine the image information of the partial fields of view and the image information of the total field of view. Combining of the image information may be performed, e.g., such that the degree of scanning of the total field of view is lower than a degree of scanning of the partial fields of view. A degree of scanning may be understood to mean a local resolution of the partial or total field of view, i.e., a quantity which indicates which surface in the object area is projected onto which surface area or pixel size of the image sensor. In implementations described herein, the term resolution is understood to mean the extension of the partial or total field of view that is projected onto a corresponding image sensor surface. A comparatively larger resolution thus means that a constant surface area of a field of view, given an identical pixel size, is projected onto a larger image sensor surface, and/or that a comparatively smaller object surface area is projected, given an identical pixel size, onto a constant image sensor surface. By combining the image information, a degree of scanning and/or a resolution of the combined image information 61 may be increased in relation to capturing of the total field of view.

Figure 4:
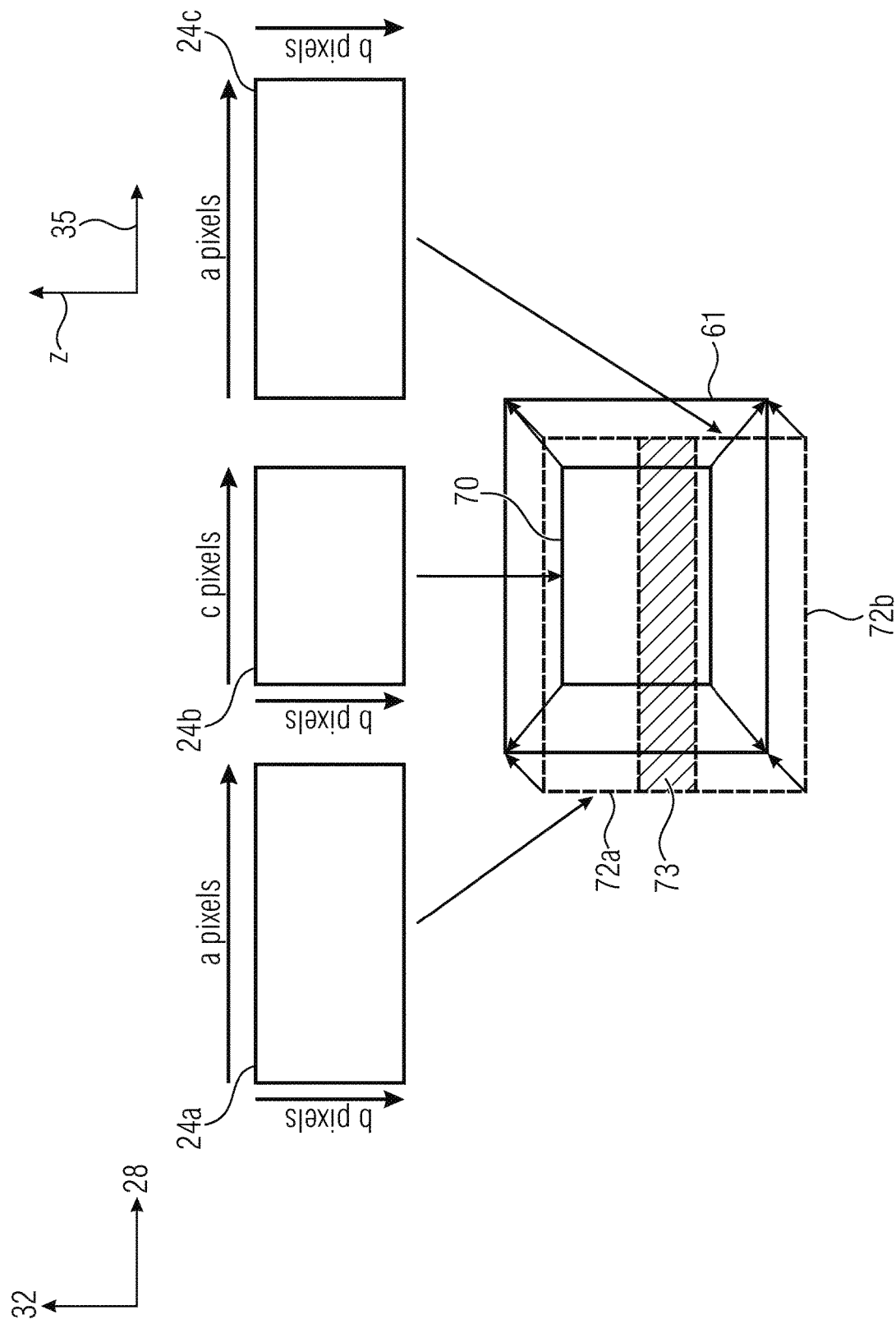
FIG. 4 shows a schematic representation of image sensor areas as may be arranged, e.g., within the multi-aperture imaging device of FIG. 1 or FIG. 3, in accordance with an embodiment.

FIG. 4 shows a schematic representation of image sensor areas 24a-c as may be arranged, e.g., within the multi-aperture imaging device 10 or 30. The partial field of view 72a is projected onto the image sensor area 24a, for example. The partial field of view 72b is projected onto the image sensor area 24c, for example. The total field of view 70 is projected onto the image sensor area 24b, for example. The spatial arrangement of the partial fields of view 72a and 72b may correspond to the configuration of FIG. 2b, for example.

The image sensor areas 24a, 24b and 24c may have, along the image direction 32, a physical extension b which is identical or is identical within a tolerance range of 20%, 10% or 5%, and which may correspond to a same number of pixels. Along the image direction 28, the image sensor areas 24a and 24c may have a physical extension a, which may correspond to an identical number of a pixels. The extension or pixels a may be larger, along the image direction 28, than the extension or number of pixels c of the image sensor area 24b. Since the partial fields of view 72a and 72b are equal in size along the image direction 28 and compared to the total field of view 70, scanning takes place at a higher resolution or at a higher degree of scanning of the total field of view along the image direction 28, i.e., a smaller area in the object area is projected onto a pixel of a constant size, so that the resulting combinational resolution, and/or the degree of scanning, is increased. A super-resolution effect may be implemented, for example, when the pixels of the images of the partial fields of view exhibit a mutual subpixel offset.

Along the image direction 32, e.g., a number of 2×b pixels are used so as to image the total field of view 70 via the partial fields of view 72a and 72b, the overlap area 73 having to be taken into account here. The disjoint or only partial overlap of the partial fields of view 72a and 72b, however, also results, along the image direction 32, in a resolution which is increased as compared to capturing of the total field of view 70 in the image sensor area 24.

Thus, the combined image information of the total field of view 61 may be increased, as compared to the resolution obtained in the imaging area 24b, by combining the images in the image sensor areas 24a to 24c. An aspect ratio of the image in the image sensor area 24b may have a value of 3:4. This enables obtaining the combinational image with an identical aspect ratio. A resolution in the image sensor areas 24a and/or 24c may be larger, along the respective image direction and/or in the nascent image, than in the image sensor area 24b, within a tolerance range of 20%, 10%, or exactly by at least 30%, at least 50%, or at least 100%; here, an extension of the overlap area is to be taken into account.

The image sensor areas 24a-c may be arranged along a line extension direction 35, which may be arranged, e.g., in parallel with the image direction 28 and/or along which the optics 64a-c of the multi-aperture imaging device 10 or 30 may be arranged. Along a direction z, which is perpendicular thereto and which may be a thickness direction of the multi-aperture imaging device, for example, the image sensor areas 24a-c may have an extension which is identical within the tolerance range, which means that the increase in the resolution of the capturing of the total field of view may be obtained while avoiding an additional thickness of the multi-aperture imaging device.

In other words, a linear symmetric arrangement of at least three camera channels, i.e., optical channels, may be implemented, wherein one of the optical channels, advantageously the central optical channel, covers the total field of view, and the (two) outer channels each cover only part of the field of view, e.g., the top/bottom or the left/right, so that together they also cover the total field of view and at the same time may have a slight overlap in the center of the field of view. This means that on the left/right and/or at the top/bottom, high-resolution partial images are obtained. In the center, a lower-resolution image, which covers the entire relevant field of view, is captured. The resolution in the central image may be reduced to an extent as dictated or enabled by the correspondingly shorter focal length for the same image height, i.e. without any consideration of the aspect ratio, and by the same pixel size. In other words, the image sensor heights 24a, 24b and 24c are identical. Without any overlap, therefore, the image height in the image sensor area 24b is only half a combined image height of 24a and 24c. To image the same field of view, the focal length (or magnification) of the optic for the image sensor area 24b (optical channel 26b) may therefore be half the length or size as for 24a and 24c. Given the same pixel size, this means half the resolution (or scanning of the field of view) in 24b as compared to 24a and 24c combined. Corresponding image widths simply result from the desired aspect ratios of the images.

The central camera channel is the reference camera for generating the depth map if the latter is created by the calculating unit. Said arrangement, which includes the symmetry with regard to the central channel, enables a high quality of the obtained combined total image with regard to occultation in the depth map. Therefore, it makes sense that the central image is also the reference for calculating the higher-resolution combined image. The at least two higher-resolution images are inserted block by block into the low-resolution reference. They therefore serve as material which may be employed when the accuracy of fit is ensured, i.e., when matching features are found in the partial fields of view and the total field of view. Said insertion may be effected in very small blocks, so that even with fine objects comprising large depth jumps, parallax-related problems may be avoided. The suitable blocks are searched for by means of correspondence, for example, which may mean that a disparity map, i.e., a depth map, is generated. However, if, for a low-resolution block, no high-resolution block is found with sufficient reliabilty, this will have no catastrophic effects.

One simply leaves the low-resolution original image as it is. In other words: holes present in the depth map will merely result in more blurred places in the total image rather than in clearly visible artifacts.

In other words, the central image sensor may capture, due to a shorter focal length, a lower-resolution image which covers the total field of view and inherently exhibits the desired aspect ratio. Said camera may also be referred to as a reference camera, for example since the obtained combined image exhibits said camera's perspective. What follows is a joining of higher-resolution partial images, which may partially overlap and will, in combination, exhibit a same aspect ratio as the reference camera.

Joining of the images of the partial fields of view by using the reference camera enables highly correct stitching in the overlap area since what is present there is an image which is inherently correct, even though it has a lower resolution. The heights of all three image sensors are, in accordance with an advantageous implementation, identical or almost identical so as to exploit available design heights in an optimum manner. All cameras may be deflected via a shared mirror (beam-deflecting means). A depth map may be calculated as follows as need be. In the overlap area 73 of the two high-resolution partial images, said calculation may be performed by the latter and the low-resolution total image; in the remaining areas, said calculation may be effected by combining one of the high-resolution partial images with the corresponding portion of the low-resolution total image.

Figure 5:
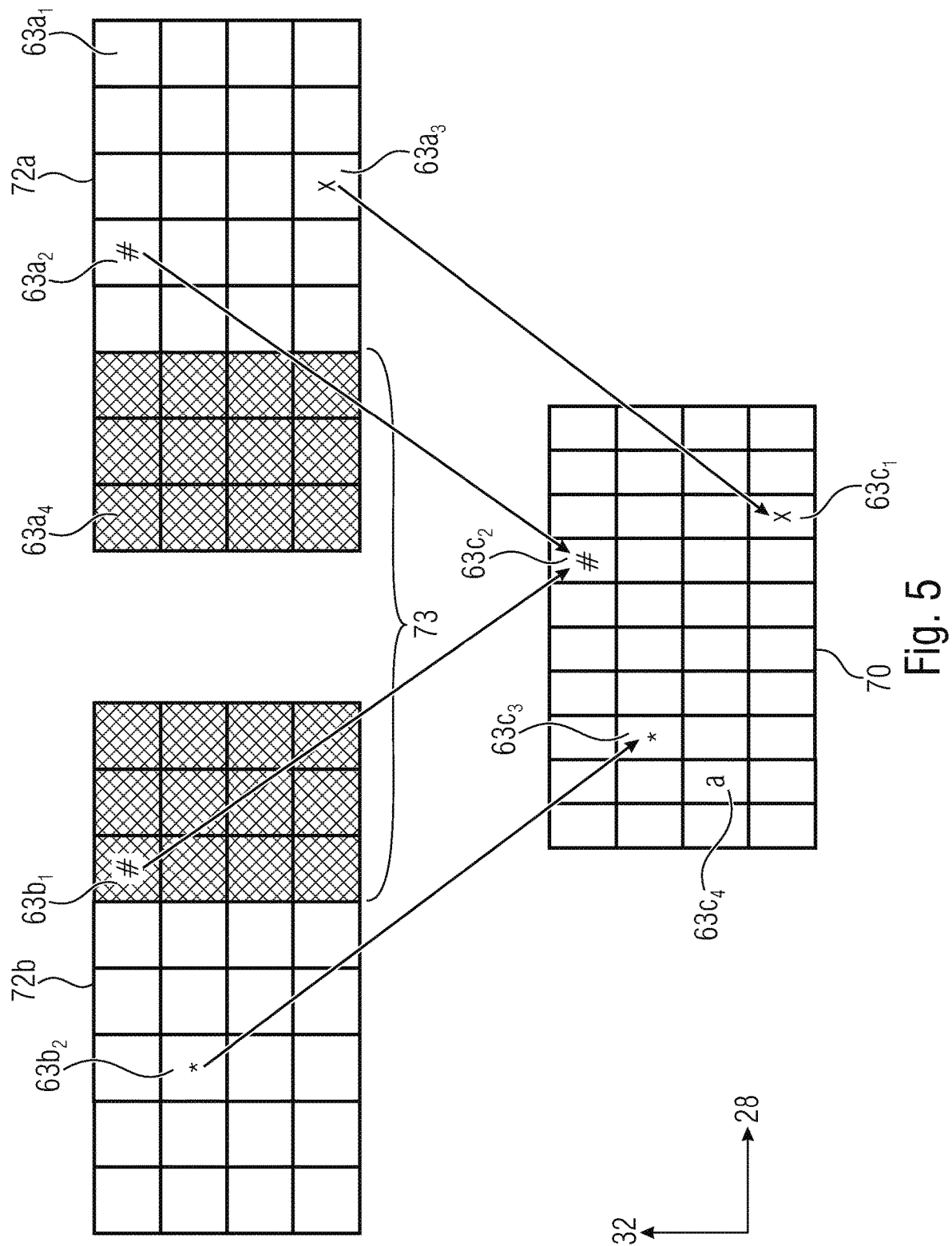
FIG. 5 shows a schematic representation of a possible implementation of the calculating unit, in accordance with an embodiment.

FIG. 5 shows a schematic representation of a possible implementation of the calculating unit 33. The calculating unit 33 may be configured to split up the image information of the total field of view 70 and the image information of the partial fields of view 72a and 72b into image blocks 63a of the partial field of view 72a, 63b and of the partial field of view 72b and 63c of the total field of view 70. An image block may comprise a specific number of pixels along both image directions 28 and 32. The blocks may have, along the image directions 28 and 32, e.g., a size of a minimum of 2 and a maximum of 1000 pixels, of a minimum of 10 and a maximum of 500 pixels, or of a minimum of 20 and a maximum of 100 pixels.

The calculating unit may be configured to associate, block by block, image information, which is contained within an image block of the total field of view, with matching image information of an image block of the first or second partial field of view 72a or 72b so as to increase a resolution of the image information of the total field of view in the combined image information by combining the first and second image blocks. The first and second image blocks may each be a matching image block of an image of different partial fields of view in an overlap area thereof. Alternatively or additionally, the first or second block may be a block of the total image, and the other block may be a block of the partial image. The calculating unit 33 is configured, for example, to identify the object, depicted as x in block $63a_3$, as matching the object x in block $63c_1$ of the total field of view 70. On the basis of the resolution of the partial field of view 72a, which is higher as compared to that of the total field of view 70, the calculating unit may combine the image information of both blocks $63a_3$ and $63c_1$ with each other so as to obtain, in the block, a resulting resolution that is higher than it originally was with regard to the total field of view. In this context, the resulting combinational resolution may correspond to or be higher than the value of the resolution of the capturing of the partial field of view 72a. The object depicted by # in a block $63c_2$ of the total field of view 70 is identified by the calculating unit, e.g., in a block $63a_2$ of the partial field of view 72a and in a block $63b_1$ of the partial field of view 72b, so that in order to improve the image quality, image information from both images of the partial fields of view 72a and 72b may be used.

An object depicted by * in a block $63c_3$ is identified, by the calculating unit, for example in a block $63b_2$ of the partial field of view 72b, so that the image information of the block $63b_2$ is employed, e.g., by the calculating unit in order to increase the image information in block $63c_3$.

In a case where no block of the partial fields of view 72a and 72b can be associated with a block of the total field of view, as depicted, e.g., for the block $63c_4$, the calculating unit may be configured to output a block of the combined total image such that at least the block $63c_4$ is located within the total image. I.e., image information may be depicted even if there is no local increase in the resolution. This will result, at the most, in minor changes in the total image, which means that at the location of the block $63c_4$, there will be a locally reduced resolution, for example.

The calculating unit 33 may be configured to perform stitching of the image information of the partial fields of view 72a and 72b on the basis of the image information of the total field of view 70. This means that total imaging of the total field of view may be employed for at least supporting or even performing mutual alignment of the partial images of the partial fields of view 72a and 72b. Alternatively or additionally, the information from the total imaging of the total field of view may be exploited for supporting or even performing arrangement of the objects of the scene from the partial images and/or within a partial image within the total image. The total field of view comprises a large number of or even all of the objects which are also depicted in the partial fields of view 72a and 72b, so that a comparison of the respective partial images with the total image of the total field of view and/or a comparison of the position of the object will enable alignment in relation to the total image and will therefore enable mutual stitching of the partial images.

In other words, the low-resolution image will a priori provide a basis for supporting stitching of the high-resolution images, i.e., a basis for orientation, since objects are already present in a joined manner in the total image. In addition to simple joining of two global partial image areas, stitching may also mean that objects will be re-integrated into the scene and/or against the background differently (with regard to their lateral positions within the image) as a function of their distance within a stitched image, which may be required or desired, depending on the distance-related object distribution within the scene. The concepts described here simplify the stitching process considerably, even if a depth map should be required for exact stitching. Occultation problems caused by there being no camera in the central position may be avoided since at least three optical channels enable at least three lines of vision toward the total field of view. Occultation in one angle of view may thus be reduced or prevented by one or two other angles of view.

Figure 6:
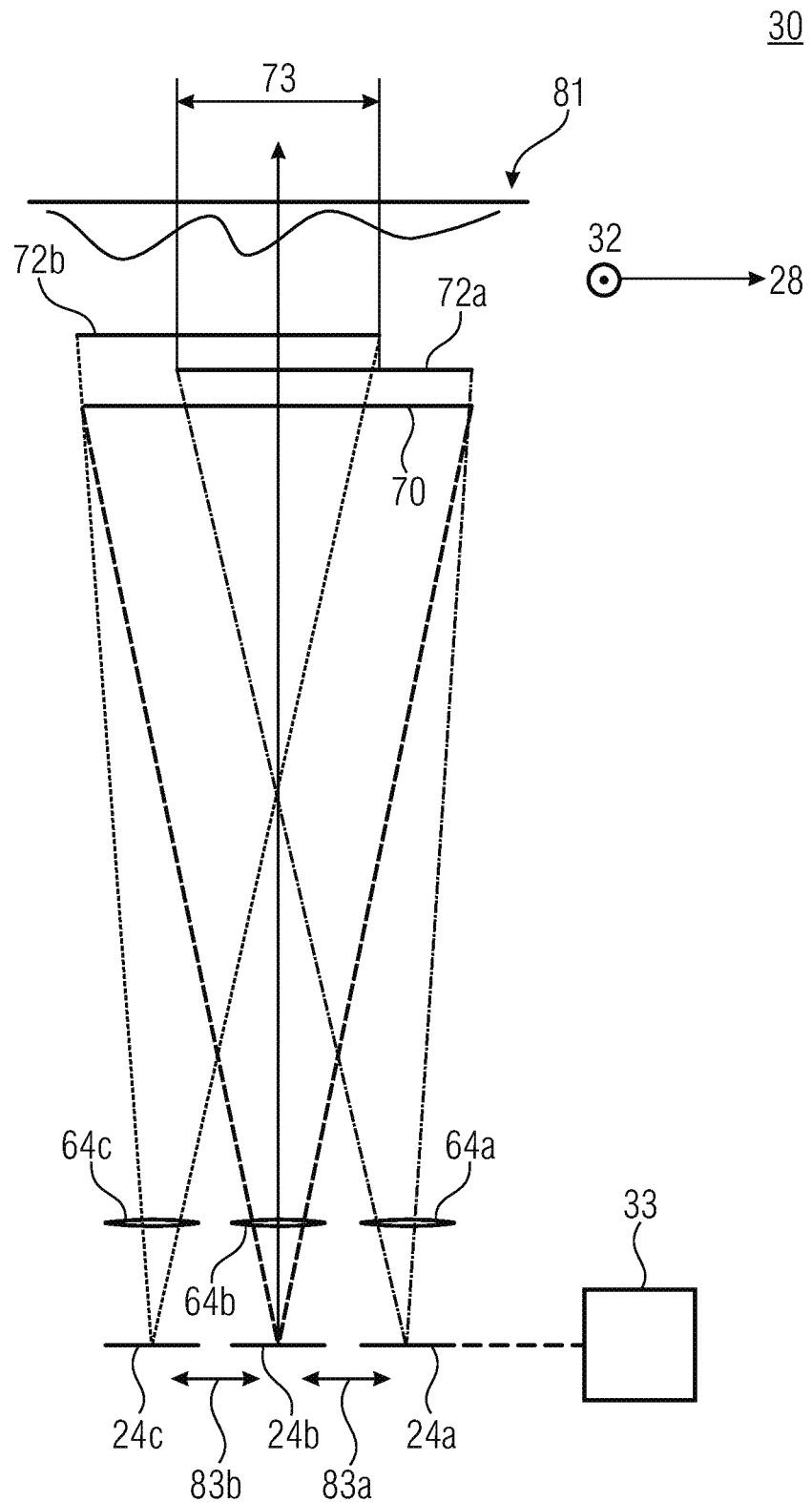
FIG. 6 shows a schematic top view of the multi-aperture imaging device of FIG. 3 and in accordance with an embodiment, said multi-aperture imaging device being configured to generate a depth map.

FIG. 6 shows a schematic top view of the multi-aperture imaging device 30 in accordance with an embodiment. The calculating unit 33 may be configured to generate a depth map 81. The depth map 81 may refer to the image information of the total field of view 70. The calculating unit 33 is configured, for example, to exploit disparities 83a between the images of the partial field of view 72a and of the total field of view 70 and 73b and between the images of the partial field of view 72b and the total field of view 70 in order to generate a depth map. This means that due to the physical distance of the optics 64a, 64b and 64c as well as of the image sensor areas 24a, 24b and 24c, different angles of view, or perspectives, are obtained which will be utilized for generating the depth map 81 on the part of the calculating unit 33. The calculating unit 33 may be configured to generate the depth map 81 in the overlap area 73, within which the partial fields of view 72a and 72b overlap, while using the image information of the partial fields of view 72a and 72b. This enables utilization of a disparity which is larger as compared to the individual disparities 83a and 83b, in simplified terms, the sum of individual disparities, as well as utilization of the high-resolution (partial) images. This means, in one embodiment, the calculating unit 33 may be configured to generate the depth map 81 in the overlap area 73 without the information of the total field of view 70 projected onto the image sensor area 24b. Alternatively, utilization of the information of the total field of view 70 in the overlap area 73 is possible and is advantageous, for example, in order to achieve a high information density.

The projections in the image sensor areas 24a and 24c may be effected, in accordance with an advantageous further development, without utilizing (e.g. RGB) Bayer color filter arrangements as in 24b or at least while using uniform color filters, so that the imaged first and second partial fields of view having single-color luminance information will be provided by the multi-aperture imaging device. For example, a single-color infrared filter, ultraviolet filter, red filter, blue filter or the like or no filter at all may be arranged, while there is no a multi-color filter such as a Bayer arrangement as in 24b. In other words, since the outer channels only contribute details in terms of increasing the quality of the image of the total field of view, it may be advantageous for the outer channels 16a and 16c to comprise no color filters. The outer channels will then contribute only luminance information, i.e., an increase in the general sharpness/in details, but no improved color information; the advantage obtained therewith lies in the increased sensitivity and, thus, in reduced noise, which for its part eventually also enables improved resolution and/or sharpness since the image will have to be smoothened less since, e.g., there is no Bayer color filter pattern superimposed on the pixels; however, the resolution present in the luminance-only channels is inherently higher (ideally double) since no de-Bayering is necessary. Effectively, a color pixel may be approximately double the size of a black-and-white pixel. This may not apply in physical terms since here, black-and-white pixels cannot be used for resolution only, but may also be used for color discrimination by superimposing black-and-white pixels with the typical RGBG filter pattern.

Figure 7:
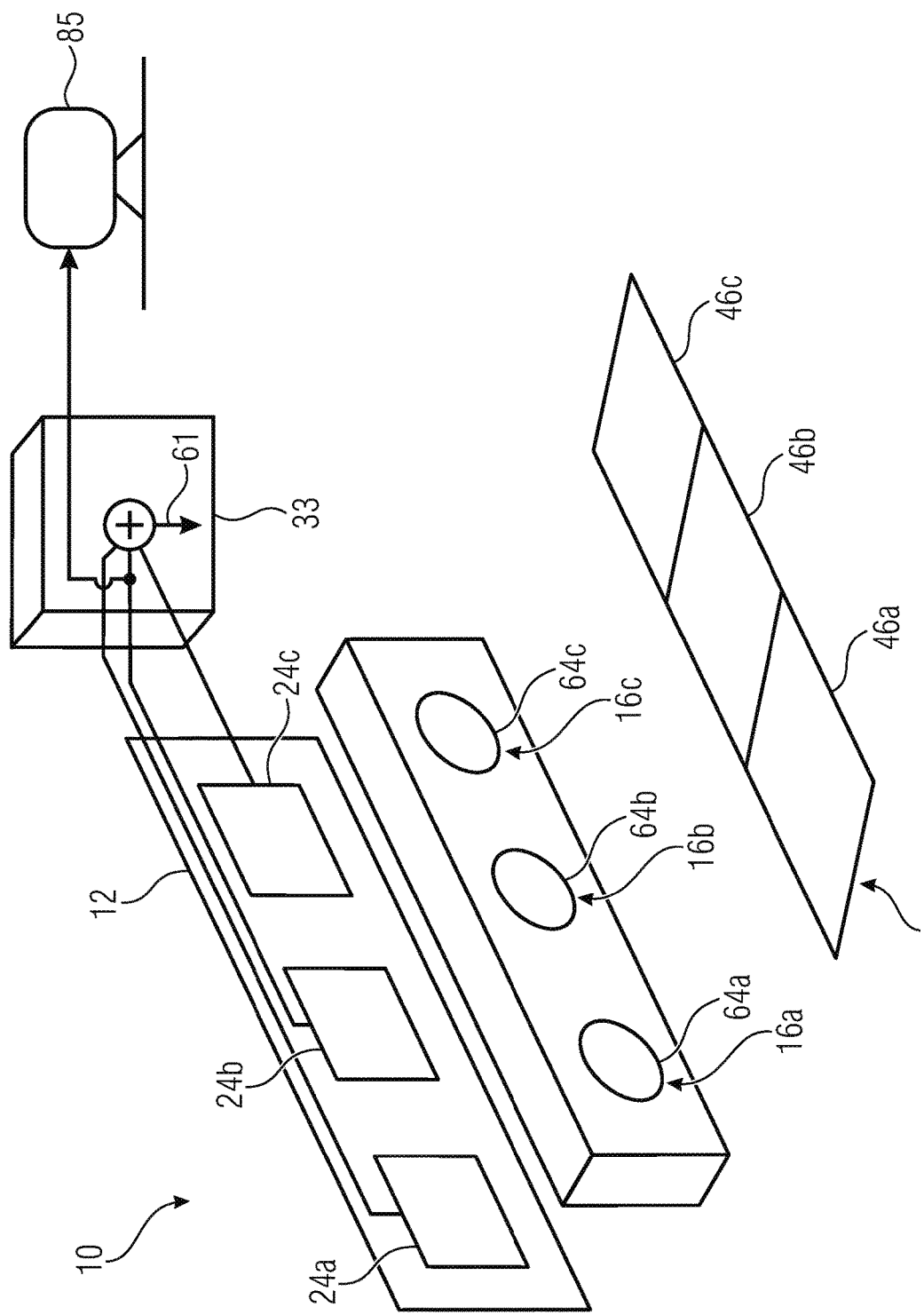
FIG. 7 shows a schematic perspective view of a multi-aperture imaging device in accordance with a further embodiment which includes display means.

FIG. 7 shows a schematic perspective view a multi-aperture imaging device 71 in accordance with a further embodiment, which includes display means 85. The multi-aperture imaging device 71 is configured to reproduce the representation of the total field of view 70, which is projected onto the image sensor area 24b, with the display means 85. To this end, the calculating unit 33 may be configured, for example, to forward the corresponding signal from the image sensor 12 to the display means 85. Alternatively, the display means 85 may also be directly coupled to the image sensor 12 and obtain the corresponding signal from the image sensor 12.

The display means 85 is configured to receive and output the image information of the total field of view at that resolution, at the most, which is provided by the image sensor area 24b. Advantageously, the resolution of the total field of view projected onto the image sensor area 24b will be forwarded unchanged to the display means 85. This enables displaying the image or video which has possibly been currently captured, for example as a preview for a user, so that said user may influence capturing. The higher-resolution images provided by the combined image information 61 may be provided to the display means 85 at a different point in time, may be provided to a different display means, may be stored or transmitted. It is also possible to obtain the combined image information 61 from time to time, i.e., only if and when required, and to otherwise utilize that image of the total field of view 70 which possibly has a lower resolution, if this is sufficient for current utilization, e.g., viewing on the display device 85, without a depth map being required or when zooming into details is dispensed with. This enables an influence to be exerted on image capturing without any combination of the image signals, which would require a certain amount of expenditure in terms of calculation and time, which will have an advantageous effect on the delay in the display means 85 and on the energy required for the calculations. By stringing together several images on the part of the multi-aperture imaging device 71, it is also possible to obtain a video signal from the image sensor 12 and to output a video signal of the total field of view on the display means 85.

For example, the multi-aperture imaging device 71 or a different multi-aperture imaging device described herein, for example the multi-aperture imaging device 10, 30 or 60, may be formed as a mobile phone, a smartphone, a tablet or a monitor.

The multi-aperture imaging device 71 may provide a real-time preview on the display 85; the two outer camera channels therefore need not always be activated, so that current may be saved and/or that no additional computing expenditure is required for linking the partial images, which enables reduced capacitor utilization of the processor and reduced energy consumption, which also enables extended battery life.

Alternatively or additionally, raw data may at first be stored, and a high-resolution image may be generated not until transmission is performed to a different calculating unit such as a PC and/or when said image is viewed on the display device while zooming into the details. Here it is possible to generate the combinational image only for relevant image areas, or to not generate the combinational image, at least in areas, for irrelevant image areas. Relevant areas may be, e.g., image areas for which magnified depiction (zoom) is desired.

Both for individual images (frames) and for a video, the image of the image sensor area 24b may thus be directly used and possibly has a resolution sufficient for a video. It is also conceivable for the central camera to be provided with an resolution suitable for common video formats, i.e., for example, 1080p or 4K, from the start, so that resampling (sampling-rate conversion), binning (combining of adjacent image elements) or skipping (skipping of pixels), which is otherwise commonly performed, may be avoided; in this context, the resolution may be high enough so that high-resolution still pictures may be generated.

Figure 8:
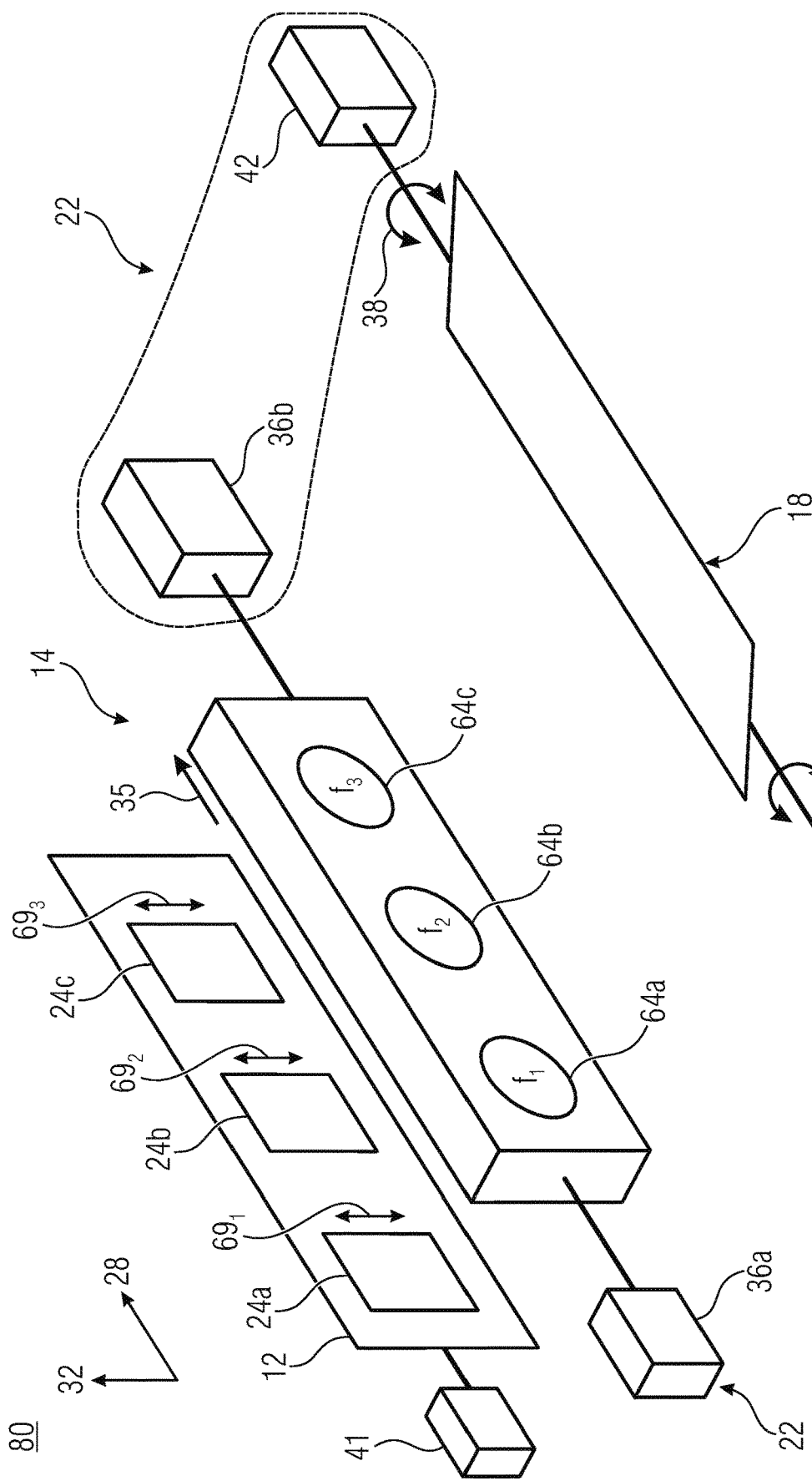
FIG. 8 shows a schematic perspective view of a multi-aperture imaging device in accordance with an embodiment which comprises an optical stabilizer and an electronic image stabilizer.

FIG. 8 shows a schematic perspective view of a multi-aperture imaging device 80 comprising an optical image stabilizer 22 and an electronic image stabilizer 41. The aspects which will be described below in terms of image stabilization may be realized, without any limitations, individually or in combination while using the functionalities of the calculating unit 33.

The optical image stabilizer 22 includes, e.g., actuators 36a, 36b and 42, the actuators 36a and 36b being configured to achieve optical image stabilization of the images of the partial fields of view in the image sensor areas 24a to 24c by displacing the array 14 along the line extension direction 35. In addition, the optical image stabilizer 22 is configured, for example, to obtain optical image stabilization along the image axis 32 by means of a rotational movement 38 of the beam-deflecting means 18. For example, the optics 64a and 64b of the array 14 comprise effective focal lengths $f_1$ and $f_3$, respectively, which differ from each other within a tolerance range of a maximum of 10%, a maximum of 5% or a maximum of 3%, so as to capture the partial fields of view in a more or less identical manner. The optic 64b may have a focal length $f_2$, which differs therefrom by at least 10%. The rotational movement 38 performed for all channels results, in cooperation with the difference in focal lengths $f_2$ and $f_1$, or within the differences in focal length between $f_1$ and $f_3$, in different displacements $69_1$ to $69_3$ of the images in the image sensor areas 24a-c. This means that the optical image stabilizer 22 achieves, by means of the rotational movement 38 performed for all channels, different effects in the images, so that at least one, several or all of the images deviate from a theoretical defect-free state. The optical image stabilizer 22 may be configured to globally minimize the deviations of all of the images, which may result in that defects arise in each of the images, however. Alternatively, the optical image stabilizer 22 may be configured to select a reference image in one of the image sensor areas 24a-d and to control the actuator 42 such that the image in the reference image or reference channel is as exact as possible, which may also be referred to as defect-free. This means that by means of optical image stabilization performed for all channels, a channel may be kept defect-free in relation to the image direction influenced, while the other channels deviate from said reference image due to the different focal lengths $f_1$ to $f_3$. In other words, a channel is corrected by means of the mechanical optical image stabilizer that is implemented, which will have an effect on all of the channels but will not keep all of the channels stable. Said further channels will be additionally corrected by means of the electronic image stabilizer.

The optical image stabilizer may be configured to provide the relative movements for the optical channels in a channel-specific manner and/or individually for groups of optical channels, e.g., for the group of the optical channels 16a and 16c for capturing the partial fields of view, and for the group including the optical channel 16b for capturing the total field of view.

The electronic image stabilizer 41 may be configured to perform channel-specific electronic image stabilization in each channel in accordance with a specified functional correlation which depends on the relative movements between the image sensor 12, the array 14 and the beam-deflecting means 18. The electronic image stabilizer 41 may be configured to stabilize each image individually. To this end, the electronic image stabilizer 41 may use global values, e.g., the camera movement or the like, so as to increase the optical quality of the images. It is particularly advantageous for the electronic image stabilizer 41 to be configured to perform electronic image correction on the basis of a reference image of the optical image stabilizer 22. The different focal lengths may provide the functional correlation between the different changes in the images caused by the optical image stabilization in a advantageously linear form, e.g., in the form:

aberration=$f(f_i, \text{relative movement})$, i.e., the aberration, globally or in relation to the reference channel, may be depicted as a function of the focal length or the differences in focal length and of the relative movement performed in order to change the line of vision or to achieve optical image stabilization. The electronic image stabilizer 41 may link an extent of the relative movement between the image sensor 12, the array 14 and the beam-deflecting means 18 to the focal lengths $f_1$ to $f_3$ or to the differences in focal lengths in relation to the reference channel in order to obtain reliable information on the electronic image stabilization to be performed, and in order to establish and/or exploit the functional correlation. The data of the optical properties and/or of the functional correlation may be obtained during calibration. Mutual alignment of images for determining displacement of an image in relation to another image may also be effected by determining a matching feature in the images of the partial fields of view, e.g., edge contours, object sizes or the like. This may be identified, e.g., by the electronic image stabilizer 41, which may further be configured to provide electronic image stabilization on the basis of a comparison of movements of the features in the first and second images. Channel-specific electronic image stabilization may thus be effected by means of channel-specific image evaluation of the movements of image details.

Alternatively or additionally to a comparison in different images, it is also possible to perform a comparison of the feature within the same image, in particular regarding two pictures or frames that are taken with a time interval between been. The optical image stabilizer 41 may be configured to identify a matching feature in the corresponding partial image at a first point in time and at a second point in time, and to provide electronic image stabilization on the basis of a comparison of movements of the feature in the first image. The comparison may indicate, e.g., a stretch of displacement by which the feature has been displaced by means of a relative movement and by which the image will have to be displaced back in order to at least partly correct the image artifact.

The optical image stabilizer may be used for stabilizing an image of the imaged partial field of view of a reference channel, e.g., the image in the image sensor area 24a. This means that the reference channel may be fully optically stabilized. In accordance with embodiments, a plurality of optical image stabilizers may be arranged which provide optical image stabilization for at least groups of optical channels, e.g., the optical channel or optical channels having a first focal length, such as the optical channel for imaging the total field of view, and optical channels having a second focal length, e.g., for imaging the partial fields of view. Alternatively, channel-specific optical image stabilization may also be provided. The electronic image stabilizer 41 is configured, e.g., to perform image stabilization in a channel-specific manner for optical channels which differ from the reference channel and which project onto the image sensor areas 24b and 24c. The multi-aperture imaging device may be configured to stabilize the reference channel in an exclusively optical manner. I.e., in one embodiment, sufficient image stabilization may be achieved in the reference channel by using solely the optical image stabilization which is achieved mechanically. For the other channels there will be additional electronic image stabilization so as to fully or partly compensate for the above-described effect of insufficient optical image stabilization due to differences in the focal length, said electronic stabilization being performed individually in each channel.

In accordance with a further embodiment it is also possible for each channel of the multi-aperture imaging device to comprise individual electronic image stabilization. The electronic image stabilization which is performed individually, i.e., to a dedicated extent, for each channel of the multi-aperture imaging device may be effected such that a specified functional correlation between the image displacements to be implemented in the individual channels is exploited. For example, the displacement along the direction 32 within a channel amounts to 1.1 times, 1.007 times, 1.3 times or 2 or 5 times the displacement along the direction 32 in a different image. Furthermore, this channel-specific functional correlation may depend on the relative movements between the beam-deflecting unit and/or the array and/or the image sensor, which functional correlation may be linear or correspond to an angular function which images an angle of rotation of the beam-deflecting means onto an extent of the electronic image stabilization along the image direction. An identical correlation may be obtained with identical or different numerical values for the direction 28.

What applies to all embodiments is that the implemented relative movements may be captured by corresponding additional sensors such as gyroscopes and others, for example, or may be derived from the captured image data of one, several or all of the channels. Said data or information may be used for the optical and/or electronic image stabilizer, i.e., the multi-aperture imaging device is configured, for example, to receive a sensor signal from a sensor and to evaluate the sensor signal with regard to information correlating with a relative movement between the multi-aperture imaging device and the object, and to control the optical and/or electronic image stabilizer while using said information.

The optical image stabilizer may be configured to obtain optical image stabilization along the image axes 28 and 32 by moving different components, e.g., the array 14 for stabilization along the direction 28, and rotation 38 of the beam-deflecting means 18 for stabilization along the direction 32. In both cases, differences in the optics 64a-c have an effect. The previous explanations regarding electronic image stabilization may be implemented for both relative movements. In particular, considering the directions 28 and 32 separately from each other enables taking into account different deviations between the optics 64a-c along the directions 28 and 32.

Embodiments described herein may share an image axis 28 and/or 32 for the partial images in the image sensor areas 24a-c. Alternatively, the directions may also differ and be converted to each other.

Figure 9:
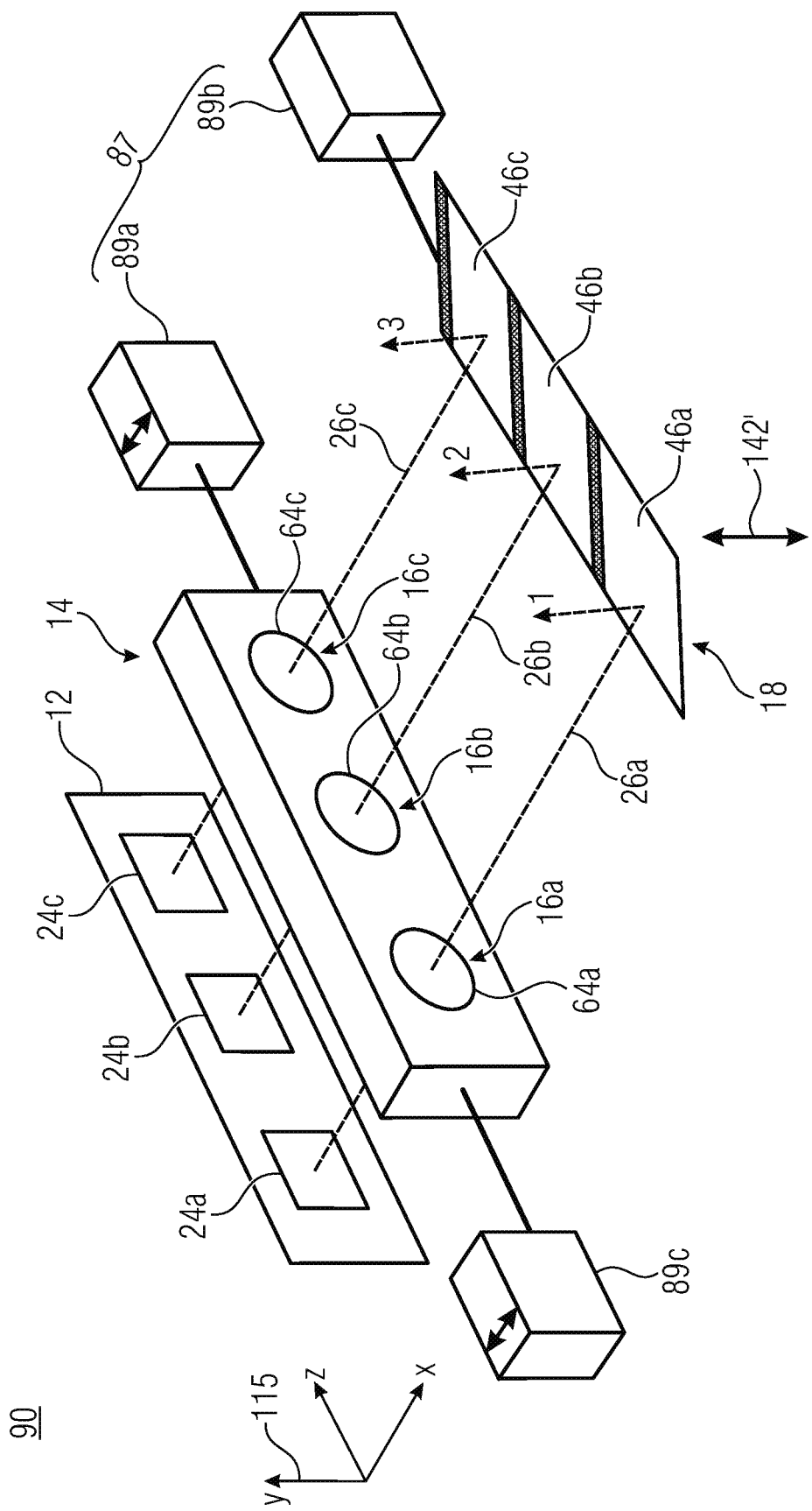
FIG. 9 shows a schematic perspective view of a multi-aperture imaging device in accordance with a further embodiment which includes focusing means.

FIG. 9 shows a schematic perspective view of a multi-aperture imaging device 90 in accordance with a further embodiment, which includes focusing means 87. The focusing means 87 may include one or more actuators 89a, 89b and/or 89c, which are configured to change a distance between the array 14 and the image sensor 12 and/or between the beam-deflecting means 18 and the array 14 and/or between the beam-deflecting means 18 and the image sensor 12, so as to adjust focusing of the images onto the image sensor areas 24a, 24b and/or 24c. Even though the optics 64a, 64b and 64c are depicted to be arranged on a shared carrier so as to be movable together, at least the optic 64b, the image sensor area 24b and/or the beam-deflecting area 46b may be moved individually so as to adjust focusing for the optical channel 16b such that it differs from focusing in other channels. I.e., the focusing means 87 may be configured to adjust a relative movement for the first and second optical channels 16a and 16c and a relative movement for the optical channel 16b such that said relative movements differ from one another.

The focusing means 87 may be combined with the optical image stabilizer 22, a movement provided both in the optical image stabilizer 22 and in the focusing means 87 by actuators may be provided by additionally arranged actuators or also by a shared actuator which provides movements between components both for the purpose of focusing and for optical image stabilization.

In other words, utilization of separate actuators for autofocus (AF) and possibly optical image stabilization (OIS) is advantageous. Because of the possibly different architectures of the adjacent channels with regard to resolution and focal length, channel-specific actuation may enable obtaining channel-specific adjustment, so that the advantages of autofocusing and/or of image stabilization in all of the channels may be obtained. For example, different image-side distances covered are required for focusing purposes for the function of autofocus at different focal lengths so as to perform same with high quality. Alternative structural forms may be implemented such that the optical channel which is configured to capture the total field of view is configured without any beam-deflecting means.

Figure 10:
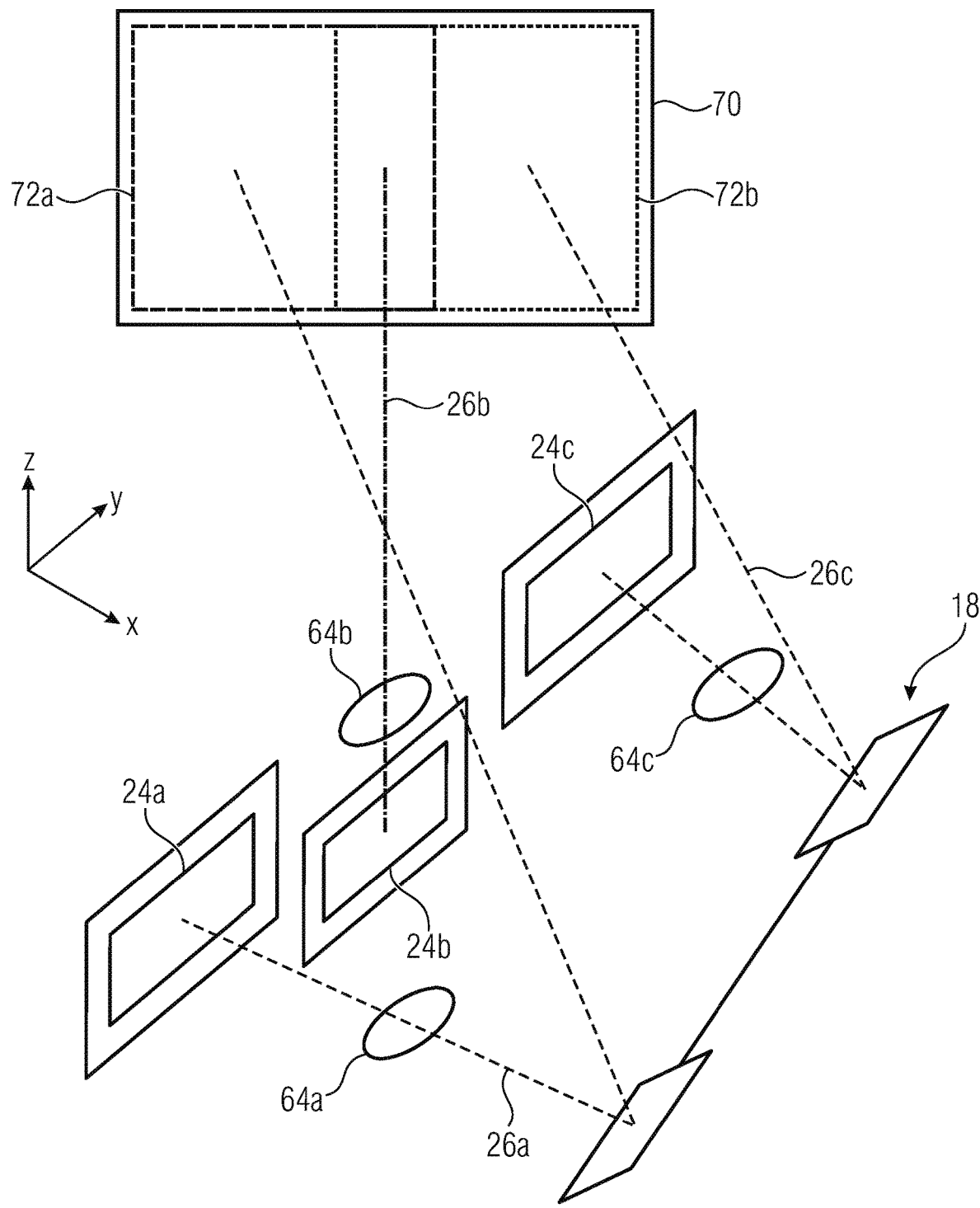
FIG. 10 shows a schematic perspective view of a multi-aperture imaging device in accordance with a further embodiment, wherein the image sensor areas are arranged on at least two mutually different chips and are orientated against one another.

FIG. 10 shows a schematic perspective representation of a multi-aperture imaging device 100 in accordance with a further embodiment, wherein the image sensor areas 24a to 24c are arranged on at least two chips which differ from one another and are oriented, i.e., tilted against one another. The image sensor area 24b may comprise, in combination with the optic 64b, a first line of vision possibly directly to the total field of view 70. The image sensor areas 24a and 24c may comprise, in combination with the optics 64a and 64c associated with them, a line of vision which differs from the former, e.g., is perpendicular thereto along an x direction, the optical paths 26a and 26c being deflected toward the partial fields of view 72a and 72b by the beam-deflecting means 18. This represents a structural form which is alternative to the previously described multi-aperture imaging devices.

Utilization of the beam-deflecting means 18 may result in a certain mirror size or deflection surface area size, which may be larger for channel 24b than for the adjacent channels for capturing the partial fields of view since the channel 16b after all has to capture the total field of view, which is larger than the partial fields of view 72a and 72b. This may result in an increase in size along a thickness direction of the device, e.g. along a z direction, which in some embodiments is undesired. Utilization of the beam-deflecting means 18 may therefore be reconfigured such that only the optical paths 26a and 26c are deflected, while the optical path 26b is directed directly, i.e. without any deflection, toward the total field of view 70.

In other words, the central camera channel is centrally mounted, without any deflection mirrors, i.e., in a classical orientation, between the two deflected higher-resolution camera channels such that it directly looks out from the plane of the device, e.g., a telephone. Due to the relatively low resolution, e.g., of a value of 0.77 and/or 1/1.3, 0.66 and/or 1/1.5, or 0.5 and/or ½, which corresponds to an above-described higher resolution of the additional channels of at least 30%, at least 50% or at least 100%, and due to a correspondingly shorter focal length, the central camera channel comprises, in such a stand-up configuration, an approximately same design height along the z direction as the two outer camera channels have in a lying configuration. Said solution may possibly prevent switching of the line of vision of the central channel 16b, which may be compensated for, however, by possibly also arranging an additional camera channel. Arranging an autofocus function and/or optical image stabilization may be provided by arranging actuators individually. In yet other words: a large field of view "1" may be imaged "standing up" with a short focal length and/or small amount of magnification, and a smaller partial field of view "2" may be imaged "in a lying position and with a folded optical path" with a longer focal length and/or a larger amount of magnification and may be best adapted to the respective circumstances. "1" is already designed to be short, but enables a large field of view, which, however, may also render the mirror large, while "2" may be designed to be long and, due to the smaller field of view, requires a smaller mirror.

Figure 11:
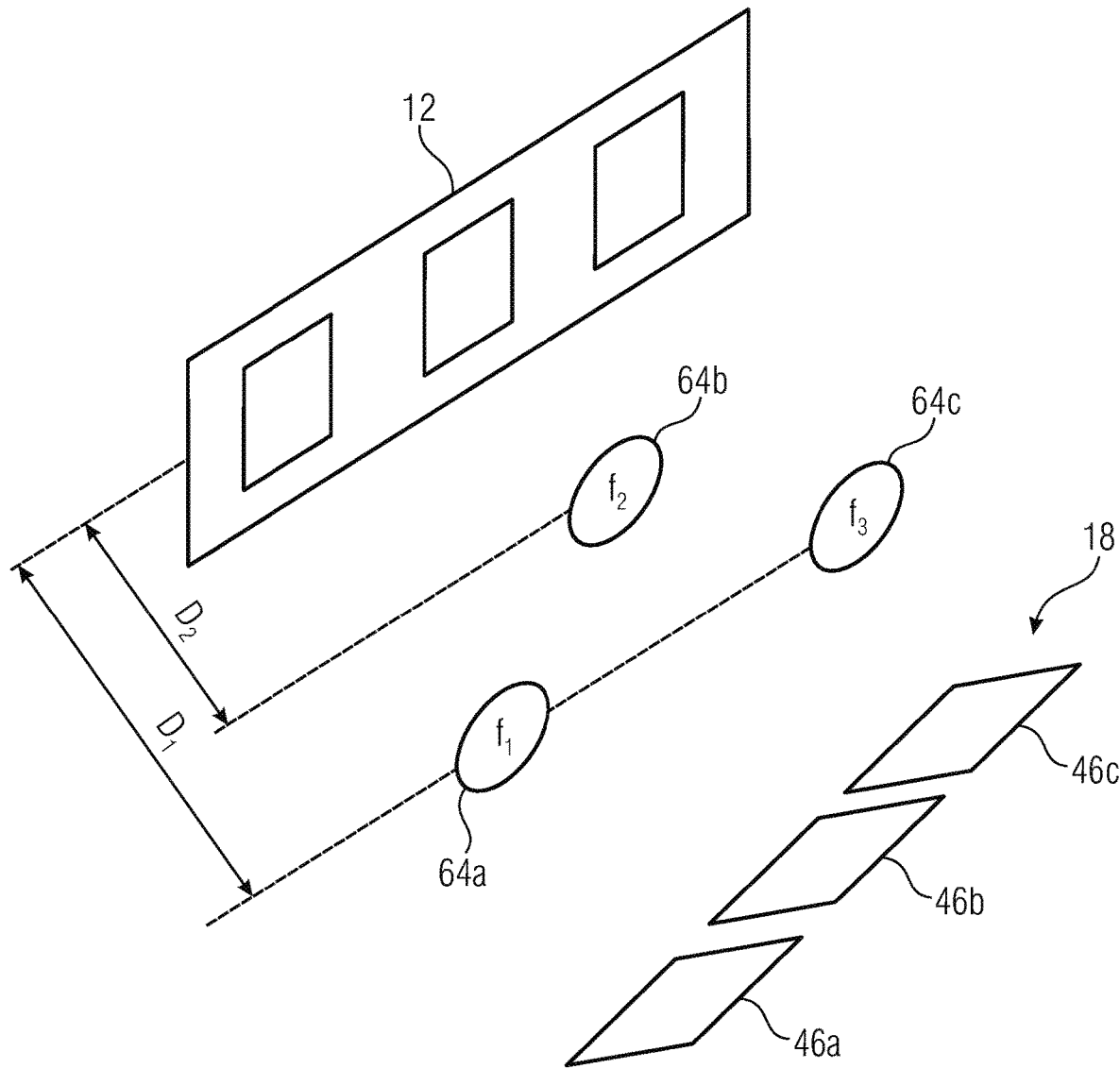
FIG. 11 shows a schematic perspective view of a multi-aperture imaging device in accordance with a further embodiment, wherein optics have different optical lengths.

FIG. 11 shows a schematic perspective view of a multi-aperture imaging device 110 in accordance with a further embodiment, wherein a distance $d_1$ of the optics 64a and 64c, which comprise the focal lengths $f_1$ and $f_3$, from the image sensor 12 is larger than a distance $d_2$ between the optic 64b and the image sensor 12, the optic 64b comprising the focal length $f_2$. The distance $d_1$ and/or $d_2$ may thus be adapted to the focal lengths of the optics 64a to 64c. Beam-deflecting areas 46a to 46c of the beam-deflecting means 18 may be individually controllable if the beam-deflecting means 18 is arranged.

Figure 12:
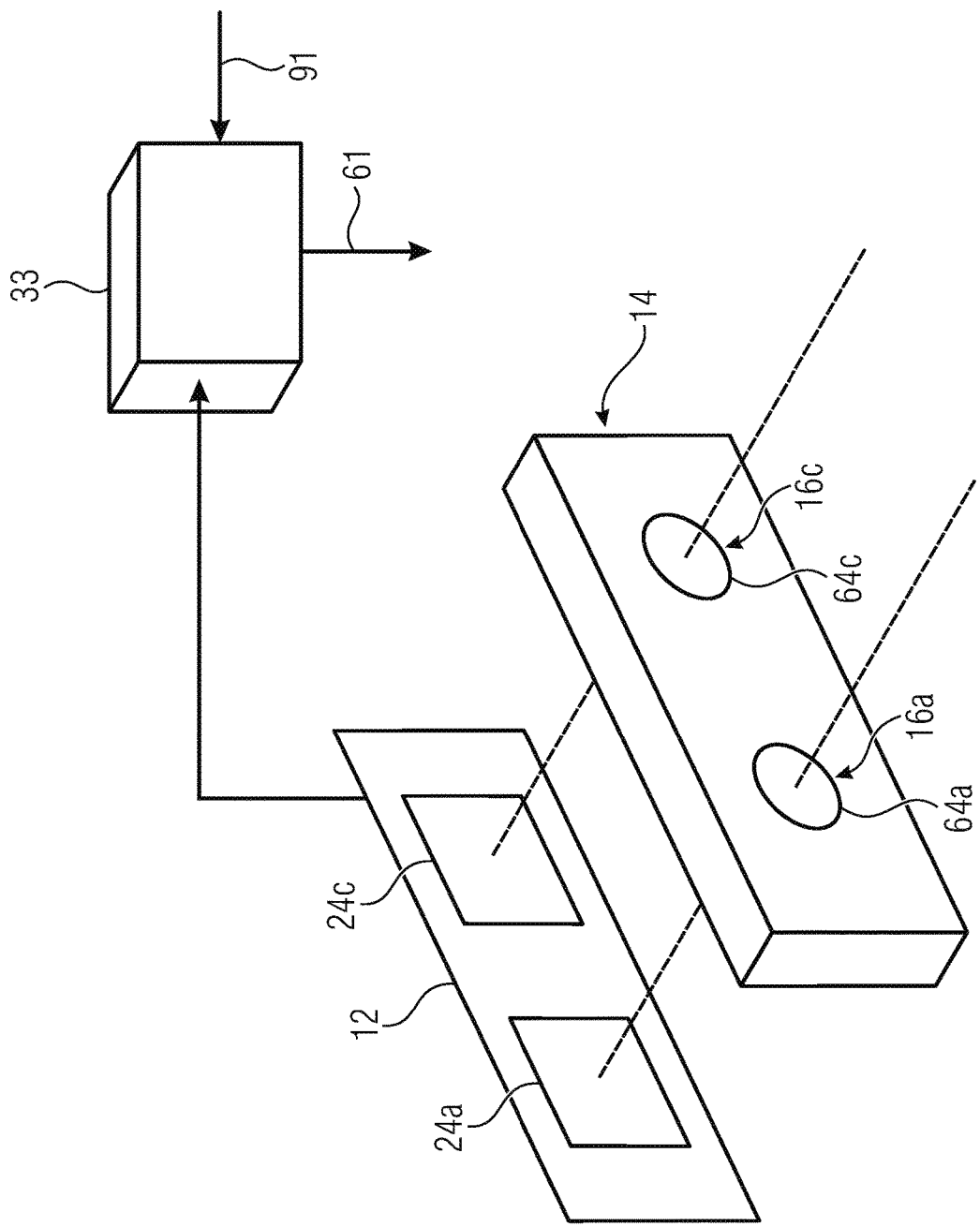
FIG. 12 shows a schematic perspective view of a device in accordance with a further embodiment.

FIG. 12 shows a schematic perspective view of a device 120 in accordance with a further embodiment. The device 120 includes the image sensor 12 including the image sensor areas 24a and 24c. The device 120 further includes the array 14 comprising the optical channels 16a and 16c. Each of the optical channels 16a and 16c unchangedly comprises the optic 64a and 64c, respectively, for imaging a partial field of view 72a and 72b, respectively, of the total field of view 70, as was described in connection with above-described multi-aperture imaging devices. In simplified terms, the image sensor 12 and the array 14 may be configured in absence of the optical channel for imaging the total field of view. The device 120 includes the calculating unit 33, which is configured to obtain image information regarding the partial fields of view 72a and 72b from the image sensor 12. The calculating unit 33 is further configured to obtain a signal 91 including image information of the total field of view 70. The calculating unit 33 is configured to combine the image information of the partial fields of view 72a and 72b with the image information 91 of the total field of view 70 so as to obtain the combined image information 61 of the total field of view 70.

In simplified terms, the device 120 may be an additional module for an existing camera device and may be configured to obtain, from the camera device, the image signal regarding the captured total field of view. Said camera device may be any camera. The device 120 may thus be configured to increase a resolution of the external device in that the obtained image signal 91 is superposed with additionally captured partial fields of view 72a and 72b in order to improve the quality.

The calculating unit 33 may be configured to provide the same functionality as is described in connection with the multi-aperture imaging devices described herein. This means that the device 120 may be configured to obtain the image information 91 at a first image resolution, and to obtain the image information regarding the partial fields of view 72a and 72b at a higher resolution. The combined image information 61 may comprise the higher resolution or at least a higher resolution than that of the image signal 91. Along first and second image directions, the resolution of the image signal 91 may correspond to or be smaller than, within the above-described tolerance range of 20%, 10% or 0%, the resolution of the image sensor areas 24a and 24c multiplied by the values 0.77, 0.66, and/or ½.

The calculating unit 33 may further be configured to perform said image association block by block, as is described in connection with FIG. 5. This may also mean that the calculating unit 33 performs an association criterion, e.g., a similarity analysis, an edge comparison or the like, and performs combining of the blocks only if the association criterion is met. If the association criterion is not met, the combined image information may be provided by the calculating unit 33 such that combining of the blocks in the evaluated block is not performed.

The calculating unit 33 may be configured to perform stitching of the image information of the partial fields of view 72a and 72b on the basis of the image information of the total field of view 70. Since only the image information is evaluated, it may be irrelevant to the calculating unit 33 whether or not the image information regarding the total field of view 70 is obtained from the system's own image sensor 12 or from the image sensor of an external device.

As was described for the multi-aperture imaging devices, the calculating unit may be configured to generate a depth map for the image information of the total field of view while using a first disparity between a line of vision of the channel for capturing the total field of view and an image of the first partial field of view and/or a second disparity between the image of the total field of view and an image of the second partial field of view. Even though the total field of view was captured by a different camera, it comprises a line of vision toward the total field of view, so that a disparity can be evaluated, in particular if the device is calibrated together with the device providing the image signal 91.

As was described above, the calculating unit 33 may be configured to generate the depth map in an overlap area of the partial images of the partial fields of view 72a and 72b by exclusively using the image information of the partial fields of view.

The device 120 may comprise an optical image stabilizer, e.g., the optical image stabilizer 22, which is configured to provide optical image stabilization by generating a relative movement between the image sensor 12 and the array 14 along first and second directions, e.g., along image directions 28 and 32. Alternatively or additionally, the device 120 may include focusing means, e.g., focusing means 87, so as to adjust a focus of the device 120. This may be effected by generating a relative movement between at least one of the optics 64a and 64b of the optical channels 16a and 16b and the image sensor 12.

Figure 13:
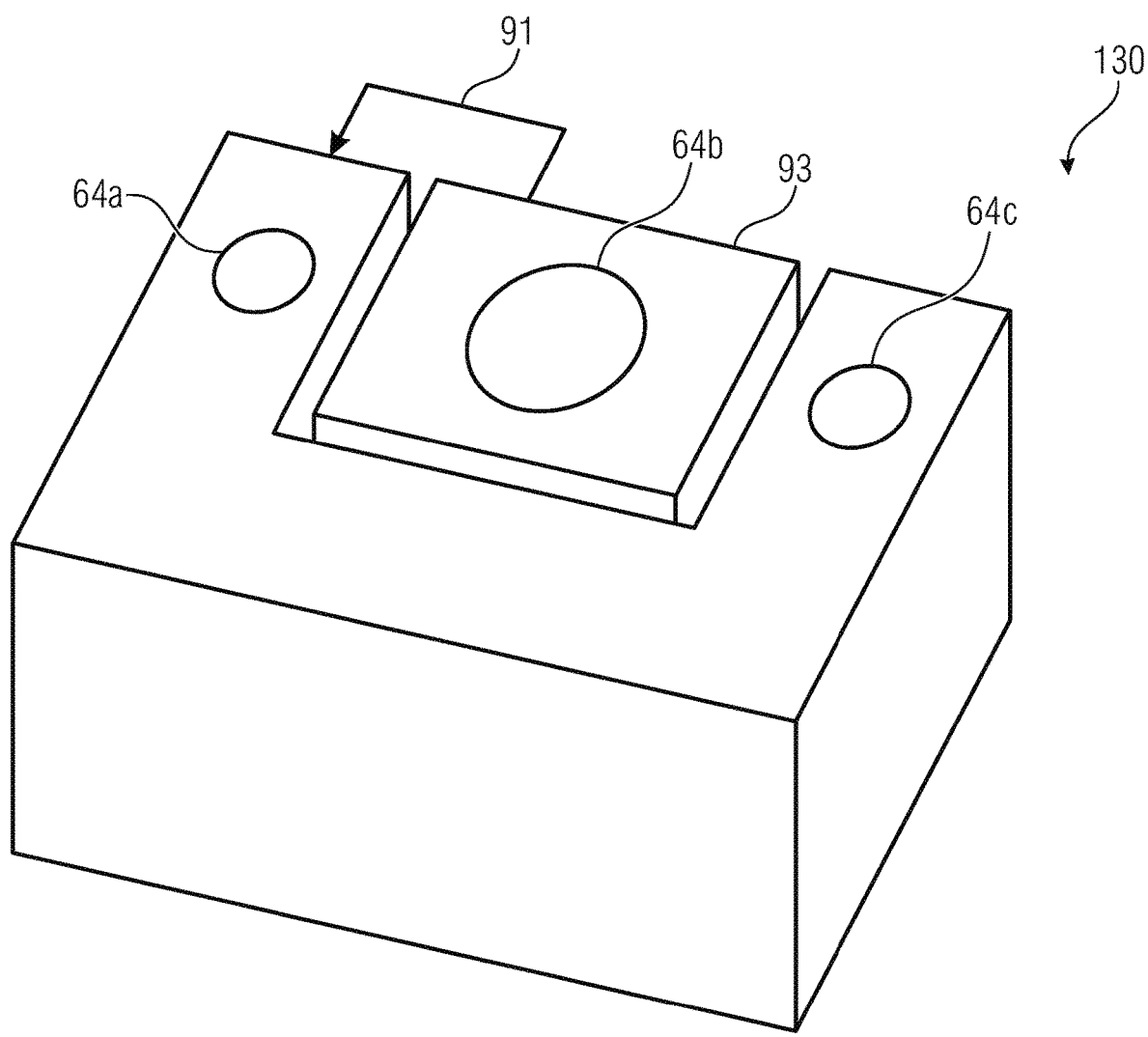
FIG. 13 shows a schematic perspective view of a supplementation device in accordance with an embodiment.

FIG. 13 shows a schematic perspective view of a supplementation device 130 in accordance with an embodiment. The supplementation device 130 is configured to supplement a camera or image capturing device 93, the camera or image capturing device 93 being configured to generate the image signal 91 and to provide it to the supplementation device 130. For example, the supplementation device 130 includes the device 120 and is configured to be coupled to the camera 93. Thus, the supplementation device 130 is configured to expand or to supplement image processing of the camera 93. This may also be understood to be an add-on device which, e.g., provides a pair of outer channels as resolution boosts to an existing system. This means that the above-described central channel may be a conventional camera module which the supplier, e.g., of a mobile phone, knows and understands and for which there exists an established supply chain. The outer channels comprising the optics 64a and 64c are additional modules which are installed next to or around the former. A folded optical path may remain, the design height thus adjusts to the old camera module. Even though a design height of the overall system will not be thinner than the camera module 33, an increase in the design height may also be avoided by increasing the resolution by means of the additional module. Instead, the outer channels together have a larger sensor area than the inner module. If the pixels are equal in size, the module will thus have a higher overall resolution and, consequently, a finer angular resolution. Therefore, it may be used for increasing the resolution as compared to the camera 93. Here, too, the sensors may be configured, in embodiments, without any color filters. This means that the image information of the imaged first and second partial fields of view may be provided having single-color luminance information. The additional modules may, but need not necessarily, be assembled symmetrically around the camera module of the camera 93. Other forms of assembly such as diagonal or asymmetric, for example, are also conceivable and may be compensated for via image processing. Depth maps may be generated unchangedly, optical and/or electronic image stabilization as well as autofocus may be provided.

Figure 14:
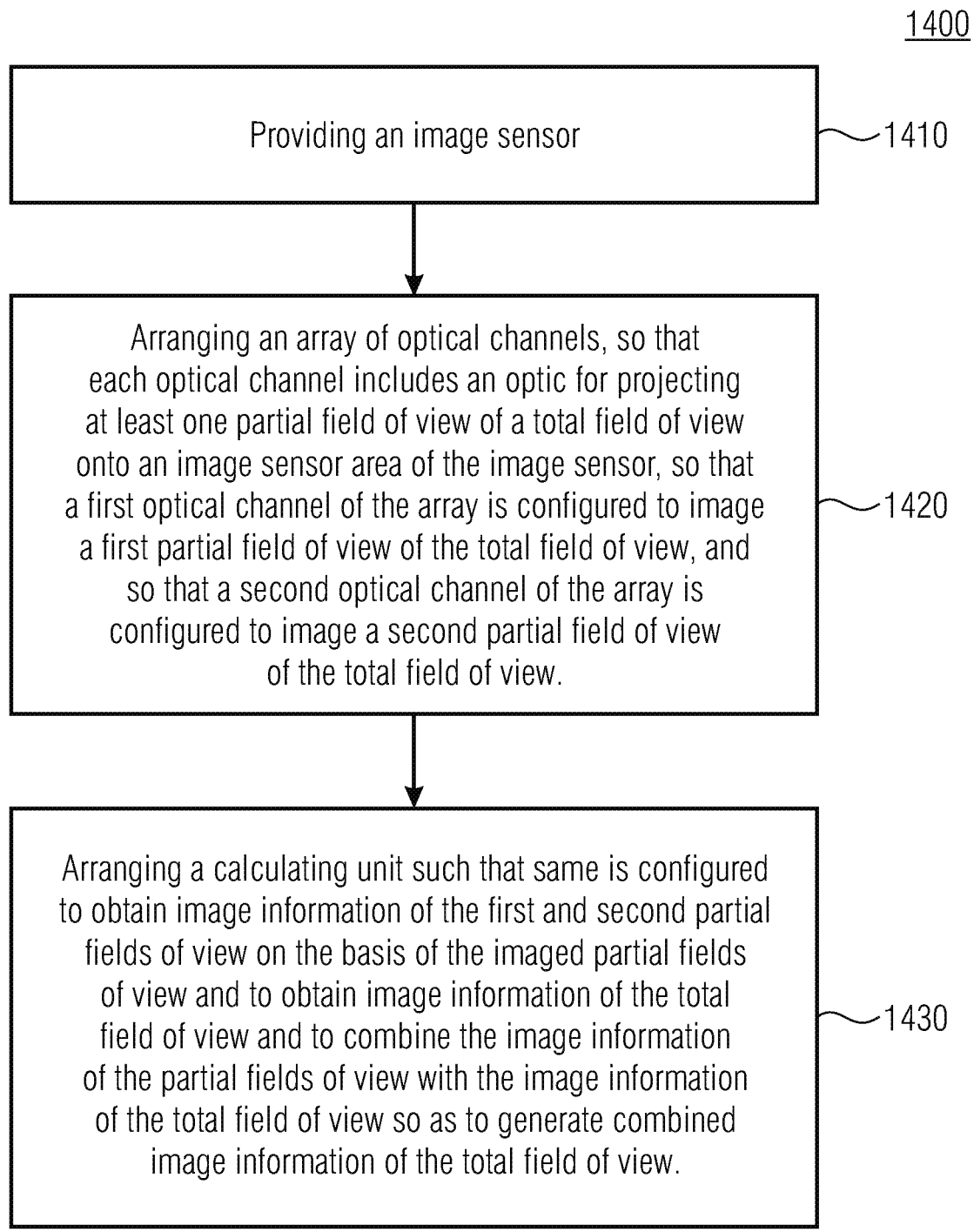
FIG. 14 shows a schematic flow chart of a method of providing a device in accordance with an embodiment.

FIG. 14 shows a schematic flowchart of a method 1400 for providing a device in accordance with an embodiment, e.g., the device 120. A step 1410 comprises providing an image sensor. A step 1420 comprises arranging an array of optical channels, so that each optical channel includes an optic for projecting at least one partial field of view of a total field of view onto an image sensor area of the image sensor, so that a first optical channel of the array is configured to image a first partial field of view of the total field of view, and so that a second optical channel of the array is configured to image a second partial field of view of the total field of view. A step 1430 comprises arranging a calculating unit such that same is configured to obtain image information of the first and second partial fields of view on the basis of the imaged partial fields of view and to obtain image information of the total field of view and to combine the image information of the partial fields of view with the image information of the total field of view so as to generate combined image information of the total field of view.

Figure 15:
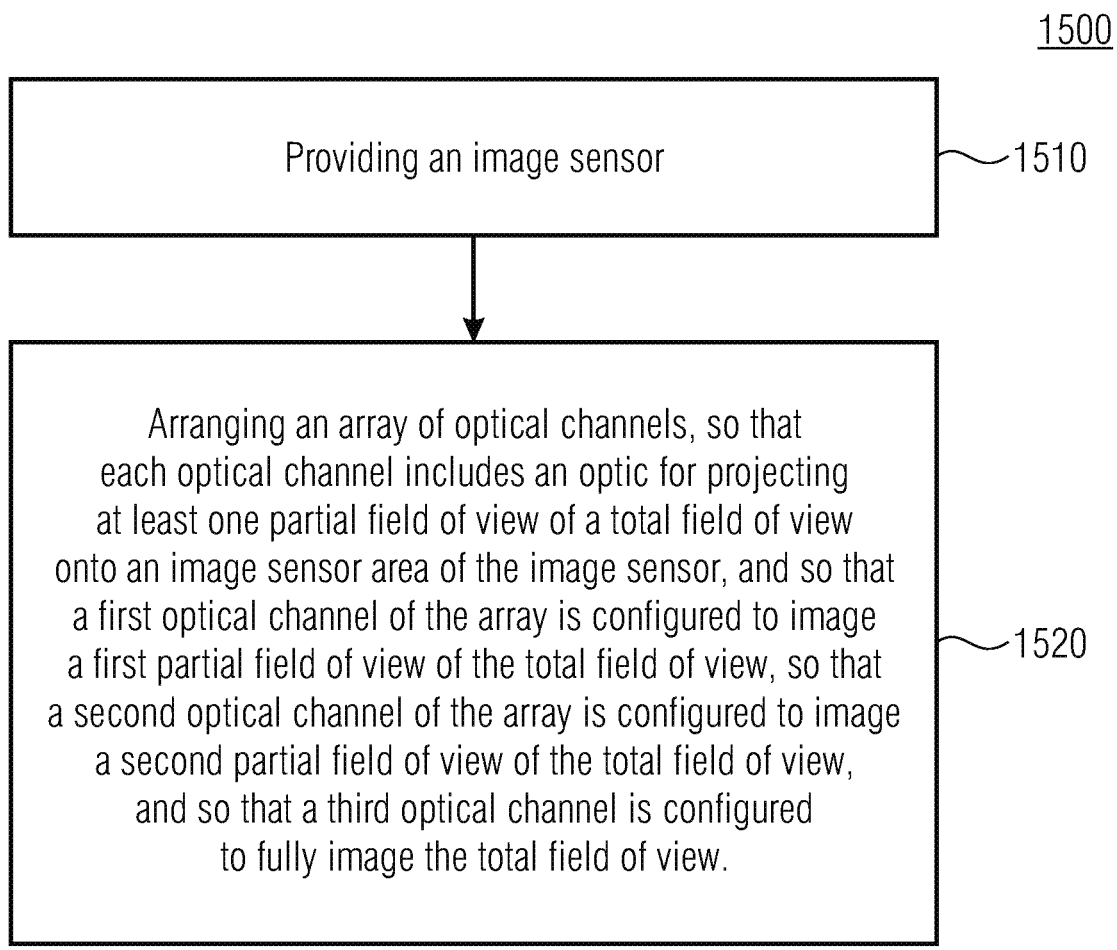
FIG. 15 shows a schematic flow chart of a method of providing a multi-aperture imaging device in accordance with an embodiment.

FIG. 15 shows a schematic flowchart of a method 1500 for providing a multi-aperture imaging device in accordance with an embodiment, e.g., multi-aperture imaging device 10. A step 1510 comprises providing an image sensor. A step 1520 comprises arranging an array of optical channels such that each optical channel includes an optic for projecting at least one partial field of view of a total field of view onto an image sensor area of the image sensor, and so that a first optical channel of the array is configured to image a first partial field of view of the total field of view, so that a second optical channel of the array is configured to image a second partial field of view of the total field of view, and so that a third optical channel is configured to fully image the total field of view.

The embodiments described herein provide the advantage that a low-resolution image is still used a priori for supporting stitching of the high-resolution images so as to simplify the stitching process. This allows less pronounced instances of occultation in the depth map because of the central arrangement of the camera and the symmetric arrangement of the other channels around same. This also results in fewer artifacts in the final combined image. A live view may be directly obtained, without any computing expenditure, from the central channel, possibly while using binning or skipping of pixels, so as to reduce the resolution to a required extent, but the complete field of view in the correct aspect ratio may already be obtained from the central channel since said central channel covers the entire FOV. A video may be directly derived from the central channel without any computing expenditure, which is effected by analogy with deriving images. Utilization of only three channels, i.e., a group of optical channels for capturing the partial fields of view, includes optical channels for capturing precisely two partial fields of view, allows a smaller number of components, fewer sensors, a small data transmission bandwidth and a small volume of the device or multi-aperture imaging device.

Embodiments described herein may be used as or in multi-aperture imaging systems with linear channel arrangement and smallest design heights while offering the advantages described herein as compared to known solutions.

Some explanations relate to relative directions such as top/bottom or left/right. It is understood that same are interchangeable as desired if spatial orientation is changed. This is why said terms should not be taken to be limiting and are intended to improve clarity only.

In the following, additional embodiments and aspects of the invention will be described which can be used individually or in combination with any of the features and functionalities and details described herein.

According to an embodiment, a device comprises: an image sensor 12; an array 14 of optical channels 16*a-b*, each optical channel 16*a-b* including an optic 64*a-b* for projecting a partial field of view 72*a-b* of a total field of view 70 onto an image sensor area 24*a-b* of the image sensor 12, a first optical channel 16*a* of the array 14 being configured to image a first partial field of view 72*a* of the total field of view 70, and a second optical channel 16*b* of the array 14 being configured to image a second partial field of view 72*b* of the total field of view 70; and a calculating unit 33 configured to obtain image information of the first and second partial fields of view on the basis of the imaged partial fields of view 72*a-b*, and to obtain image information of the total field of view 70, and to combine the image information of the partial fields of view with the image information of the total field of view so as to generate combined image information 61 of the total field of view.

According to a second embodiment when referring back to the first embodiment, the first and second optical channels 16*a-b* are part of a group of optical channels configured to image one partial field of view 72*a-b* of the total field of view 70, respectively, the group of optical channels being configured to jointly fully image the total field of view 70.

According to a third embodiment when referring back to the second embodiment, the group of optical channels is configured to capture precisely two partial fields of view 72*a-b*.

According to a fourth embodiment when referring back to any one of the preceding embodiments, a first partial image and a second partial image, which represent the image information of the first and second partial fields of view, comprise, along a first image direction 32, a same dimension as a total image representing the image information of the total field of view 70, and comprise, along a second image direction 28, a different dimension as compared to the total image.

According to a fifth embodiment when referring back to any one of the preceding embodiments, the device is configured to provide the image information of the imaged first and second partial fields of view having single-color luminance information.

According to a sixth embodiment when referring back to any one of the preceding embodiments, the device is configured to obtain the image information of the total field of view 70 having a first degree of scanning b×c, to obtain the image information of the first or second partial field of view 72*a-b* having a second degree of scanning b×a, which is larger than the first degree of scanning b×c, and to provide the combined image information of the total field of view 70 having a third degree of scanning larger than the first degree of scanning.

According to a seventh embodiment when referring back to the sixth embodiment, the second degree of scanning b×c is at least 30% larger, along first and second image directions 28, 32, than the first degree of scanning.

According to an eighth embodiment when referring back to any one of the preceding embodiments, the calculating unit 33 is configured to subdivide the image information of the total field of view 70 and the image information of the partial fields of view into image blocks 63a, 63b and to associate, block by block, image information x, *, #, which is contained within a first image block 63c of the total field of view, with matching image information of a second image block 63a, 63b of the first or second partial fields of view so as to increase, by combining the first and second image blocks, a degree of scanning of the image information of the total field of view 70 in the combined image information.

According to a ninth embodiment when referring back to the eighth embodiment, the calculating unit 33 is configured to associate the first block 63c with the second block 63a, 63b while applying an association criterion so as to perform the combination only if the association criterion is met, and to provide the combined image information 61 of the total field of view 70 within the first block $63c_4$ without any combination if the association criterion is not met.

According to a tenth embodiment when referring back to any one of the preceding embodiments, the calculating unit 33 is configured to perform stitching of the image information of the partial fields of view 72a-b on the basis of the image information of the total field of view 70.

According to an eleventh embodiment when referring back to any one of the preceding embodiments, the calculating unit 33 is configured to generate a depth map for the image information of the total field of view 70 while using a first disparity 83a between an image of the total field of view 70 and an image of the first partial field of view 72a and a second disparity 83b between the image of the total field of view 70 and an image of the second partial field of view 72b.

According to an twelfth embodiment when referring back to any one of the preceding embodiments, the partial fields of view 72a-b overlap within an overlap area 73; 73a-e within the total field of view 70, the calculating unit 33 being configured to generate a depth map for the image information of the total field of view 70 within the overlap area 73; 73a-e while using the image information of the first and second partial fields of view 72a-b.

According to a thirteenth embodiment when referring back to any one of the preceding embodiments, the device comprises an optical image stabilizer 22 for image stabilization along a first image axis 28 by generating a first relative movement 34; 39a between the image sensor 12 and the array 14 and for image stabilization along a second image axis 32 by generating a second relative movement 38; 39b between the image sensor 12 and the array 14.

According to a fourteenth embodiment when referring back to any one of the preceding embodiments, the device further comprises focusing means including at least one actuator 134b for adjusting a focus of the device, said actuator 134b being configured to provide a relative movement between at least one optic 64a-b of one of the optical channels 16a-b and the image sensor 12.

According to a fifteenth embodiment, a supplementation device comprises a device according to any one of the first to fourteenth embodiments and is configured to be coupled to a camera so as to obtain therefrom the image information of the total field of view 70.

According to a sixteenth embodiment, a multi-aperture imaging device 10; 30; 60; 70; 80; 90 comprises: an image sensor 12; and an array 14 of optical channels 16a-b, each optical channel 16a-b including an optic 64a-c for projecting at least one partial field of view 72a-b of a total field of view 70 onto an image sensor area 24a-c of the image sensor 12; a first optical channel 16a of the array 14 being configured to image a first partial field of view 72a of the total field of view 70, a second optical channel 16b of the array 14 being configured to image a second partial field of view 72b of the total field of view 70, and a third optical channel 16c being configured to fully image the total field of view 70.

According to a seventeenth embodiment when referring back to the sixteenth embodiment, the multi-aperture imaging device includes a beam-deflecting means 18 for jointly deflecting an optical path 26a-b of the first and second optical channels 16a-b.

According to an eighteenth embodiment when referring back to the sixteenth or seventeenth embodiment, an arrangement of optics 64a, 64c for capturing the first and second partial fields of view in the array 14 is symmetric in relation to a location of the optic 64b for imaging the total field of view 70; or wherein an arrangement of image sensor areas 24a, 24c for imaging the first and second partial fields of view 72a-b is symmetric in relation to a location of the image sensor area 24b for imaging the total field of view 70.

According to a nineteenth embodiment when referring back to any one of the sixteenth to eighteenth embodiments, an image format of the total field of view 70 corresponds to a redundancy-free combination of the imaged first partial field of view 72a and the imaged second partial field of view 72b.

According to a twentieth embodiment when referring back to any one of the sixteenth to nineteenth embodiments, the multi-aperture imaging device includes a calculating unit 33 configured to obtain image information of the first and second partial fields of view on the basis of the imaged partial fields of view 72a-b, and to obtain image information of the total field of view 70 on the basis of the imaged total field of view 70, and to combine the image information of the partial fields of view with the image information of the total field of view 70 so as to generate combined image information 61 of the total field of view 70.

According to a twenty-first embodiment when referring back to the twentieth embodiment, the calculating unit 33 is configured to subdivide the image information of the total field of view 70 and the image information of the partial fields of view into image blocks and to associate, block by block, image information, which is contained within a first image block of the total field of view 70, with matching image information of a second image block of the first or second partial fields of view so as to increase, by combining the first and second image blocks, a degree of scanning of the image information of the total field of view 70 in the combined image information.

According to a twenty-second embodiment when referring back to the twenty-first embodiment, the calculating unit 33 is configured to associate the first block with the second block while applying an association criterion so as to perform the combination only if the association criterion is met, and to provide the combined image information of the total field of view 70 within the first block without any combination if the association criterion is not met.

According to a twenty-third embodiment when referring back to any one of the twentieth to twenty-second embodiments, the calculating unit 33 is configured to perform stitching of the image information of the partial fields of view on the basis of the image information of the total field of view 70.

According to a twenty-fourth embodiment when referring back to any one of the twentieth to twenty-third embodiments, the calculating unit 33 is configured to generate a depth map 81 for the image information of the total field of view 70 while using a first disparity 83a between an image of the total field of view 70 and an image of the first partial field of view and a second disparity 83b between the image of the total field of view 70 and an image of the second partial field of view.

According to a twenty-fifth embodiment when referring back to any one of the twentieth to twenty-fourth embodiments, the partial fields of view overlap within an overlap area within the total field of view 70, the calculating unit 33 being configured to generate a depth map for the image information of the total field of view 70 within the overlap area while using the image information of the first and second partial fields of view.

According to a twenty-sixth embodiment when referring back to any one of the twentieth to twenty-fifth embodiments, the multi-aperture imaging device is configured to obtain image information of the total field of view 70 having a first degree of scanning from the sensor, to obtain the image information of the first or second partial field of view having a second degree of scanning, which is larger than the first degree of scanning, from the sensor, and to provide the combined image information of the total field of view 70 having a third degree of scanning larger than the first degree of scanning.

According to a twenty-seventh embodiment when referring back to the twenty-sixth embodiment, the second degree of scanning is at least 30% larger, along first and second image directions, than the first degree of scanning.

According to a twenty-eighth embodiment when referring back to any one of the sixteenth to twenty-seventh embodiments, the multi-aperture imaging device is configured to obtain image information of the total field of view 70, which is captured by the third optical channel, from the image sensor at a first image resolution, the multi-aperture imaging device including display means and being configured to display the image information at the first image resolution at the most.

According to a twenty-ninth embodiment when referring back to the twenty-eighth embodiment, the multi-aperture imaging device is configured to output a video signal of the total field of view 70 on the display means on the basis of consecutive images of the total field of view 70.

According to a thirtieth embodiment when referring back to any one of the sixteenth to twenty-ninth embodiments, the multi-aperture imaging device includes beam-deflecting means 18 for shared deflecting of an optical path 26a-c of the optical channels 16a-c, and comprising an optical image stabilizer 22 for image stabilization along a first image axis 28 by generating a first relative movement between the image sensor 12, the array 14 and the beam-deflecting means 18, and for image stabilization along a second image axis 32 by generating a second relative movement 38 between the image sensor 12, the array 14 and the beam-deflecting means 18.

According to a thirty-first embodiment when referring back to the thirtieth embodiment, the optical image stabilizer 22 is configured to provide a first relative movement for the first and second optical channels and a second relative movement for the third optical channel.

According to a thirty-second embodiment when referring back to the thirtieth or thirty-first embodiment, the first relative movement includes at least one of a translational relative movement between the image sensor 12 and the array 14, a translational relative movement between the image sensor 12 and the beam-deflecting means 18, and a translational relative movement between the array 14 and the beam-deflecting means 18, and wherein the second relative movement 38 includes at least one of a rotational movement of the beam-deflecting means 18, a translational relative movement between the image sensor 12 and the array 14, and a translational relative movement between the array 14 and the beam-deflecting means 18.

According to a thirty-third embodiment when referring back to any one of the thirtieth to thirty-second embodiments, the multi-aperture imaging device further comprises an electronic image stabilizer 41 for image stabilization of the first optical channel 16a of the array 14 along the first and second image axes 28, 32.

According to a thirty-fourth embodiment when referring back to the thirty-third embodiment, the electronic image stabilizer 41 is configured to stabilize the first optical channel 16a to a first extent along the first and second image axes 28, 32, and further is configured for image stabilization of the second optical channel 16c to a second extent along the first and second image axes 28, 32.

According to a thirty-fifth embodiment when referring back to the thirty-third or thirty-fourth embodiment, the optical image stabilizer 22 is configured to perform optical image stabilization such that said optical image stabilization is related to an image of a first one of the partial fields of view 72a-b, wherein the electronic image stabilizer 41 is configured to stabilize an image of a second partial field of view 72a-b in relation to the image of the first partial field of view 72a-b.

According to a thirty-sixth embodiment when referring back to any one of the thirty-third to thirty-fifth embodiments, the optical image stabilizer 22 is configured to stabilize an image of the imaged partial field of view 72a-b of a reference channel from a group including the first optical channel 16a and the second optical channel 16c, and wherein the electronic image stabilizer 41 is configured to perform image stabilization in a channel-specific manner for optical channels 16a-c which differ from the reference channel, the multi-aperture imaging device being configured to stabilize the reference channel in an exclusively optical manner.

According to a thirty-seventh embodiment when referring back to any one of the thirty-third to thirty-sixth embodiments, the electronic image stabilizer 41 is configured to perform image stabilization for each optical channel 16a-c in a channel-specific manner.

According to a thirty-eighth embodiment when referring back to the thirty-seventh embodiment, the electronic image stabilizer 41 is configured to perform channel-specific electronic image stabilization in each channel in accordance with a specified functional correlation which depends on the relative movements between the image sensor 12, the array 14 and the beam-deflecting means 18.

According to a thirty-ninth embodiment when referring back to the thirty-eighth embodiment, the functional correlation is a linear function.

According to a fortieth embodiment when referring back to any one of the thirty-third to thirty-ninth embodiments, the optical image stabilizer 22 is configured to provide the optical image stabilization along one of the image directions 28, 32 on the basis of a rotational movement 38 of the beam-deflecting means 18, the functional correlation being an angular function which projects an angle of rotation of the beam-deflecting means 18 onto an extent of the electronic image stabilization along the image direction 28, 32.

According to a forty-first embodiment when referring back to any one of the thirty-third to fortieth embodiments, the electronic image stabilizer 41 is configured to identify a matching feature in a first partial image of a first partial field of view 72a-b at a first point in time and at a second point in time, and to provide the electronic image stabilization on the basis of a comparison of movements of the feature in the first image.

According to a forty-second embodiment when referring back to any one of the sixteenth to forty-first embodiments, the multi-aperture imaging device further includes focusing means 87 including at least one actuator 89a-b for adjusting a focus of the device, said actuator being configured to provide a relative movement between at least one optic 64a-c of one of the optical channels 16a-c and the image sensor 12.

According to a forty-third embodiment when referring back to the forty-second embodiment, the focusing means 87 is configured to provide a third relative movement for the first and second optical channels 16a, 16c and a fourth relative movement for the third optical channel 16b.

According to a forty-fourth embodiment when referring back to any one of the sixteenth to forty-third embodiments, the image sensor areas are arranged on the image sensor 12 along a line extension direction 35, and wherein the image sensor areas 24a-c exhibit, along an image direction 32 perpendicular to the line extension direction, dimensions which are identical within a tolerance range of 20%.

According to a forty-fifth embodiment when referring back to any one of the sixteenth to forty-fourth embodiments, the first and second optical channels 16a, 16c are part of a group of optical channels configured to image a partial field of view 72a-c of the total field of view 70, respectively, said group of optical channels being configured to jointly fully image the total field of view 70.

According to a forty-sixth embodiment when referring back the forty-fourth embodiment, the group of optical channels is configured to capture precisely two partial fields of view 72a-b.

According to a forty-seventh embodiment when referring back to any one of the sixteenth to forty-sixth embodiments, a first partial image and a second partial image, which represent the image information, provided by the image sensor 12, of the first and second partial fields of view 72a-b, have a same dimension, along a first image direction 32, as a total image which represents image information, provided by the image sensor, of the total field of view 70, and exhibit, along a second image direction 28, a different dimension as compared to the total image.

According to a forty-eighth embodiment when referring back to any one of the sixteenth to forty-seventh embodiments, the multi-aperture imaging device is configured to provide the imaged first and second partial fields of view 72a-b having single-color luminance information.

According to a forty-ninth embodiment when referring back to any one of the sixteenth to forty-eighth embodiments, the multi-aperture imaging device is configured as a mobile phone, a smartphone, a tablet, or a monitor.

According to a fiftieth embodiment, a method 1400 of providing a device comprises: providing 1410 an image sensor; arranging 1420 an array of optical channels, so that each optical channel includes an optic for projecting at least one partial field of view of a total field of view onto an image sensor area of the image sensor, so that a first optical channel of the array is configured to image a first partial field of view of the total field of view, and so that a second optical channel of the array is configured to image a second partial field of view of the total field of view; and arranging 1430 a calculating unit such that same is configured to obtain image information of the first and second partial fields of view on the basis of the imaged partial fields of view and to obtain image information of the total field of view and to combine the image information of the partial fields of view with the image information of the total field of view so as to generate combined image information of the total field of view.

According to a fifty-first embodiment, a method 1500 of providing a multi-aperture imaging device comprises: providing 1510 an image sensor; and arranging 1520 an array of optical channels, so that each optical channel includes an optic for projecting at least one partial field of view of a total field of view onto an image sensor area of the image sensor, and so that a first optical channel of the array is configured to image a first partial field of view of the total field of view, so that a second optical channel of the array is configured to image a second partial field of view of the total field of view, and so that a third optical channel is configured to fully image the total field of view.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device comprising:
an image sensor;
an array of optical channels, each optical channel comprising an optic for projecting a partial field of view of a total field of view onto an image sensor area of the image sensor, a first optical channel of the array being configured to image a first partial field of view of the total field of view, and a second optical channel of the array being configured to image a second partial field of view of the total field of view; and
a calculating unit configured to acquire image information of the first and second partial fields of view on the basis of the imaged partial fields of view, and to acquire image information of the total field of view, and to combine the image information of the partial fields of view with the image information of the total field of view so as to generate combined image information of the total field of view;
wherein the device is configured to acquire the image information of the total field of view comprising a first degree of scanning, to acquire the image information of the first or second partial field of view comprising a second degree of scanning, which is larger than the first degree of scanning, and to provide the combined image information of the total field of view comprising a third degree of scanning larger than the first degree of scanning; or wherein the calculating unit is configured to subdivide the image information of the total field of view and the image information of the partial fields of view into image blocks and to associate, block by block, image information, which is comprised by a first image block of the total field of view, with matching image information of a second image block of the first or second partial fields of view so as to increase, by combining the first and second image blocks, a degree of scanning of the image information of the total field of view in the combined image information;

wherein a first partial image and a second partial image, which represent the image information of the first and second partial fields of view, comprise, along a first image direction, within a tolerance range, a same dimension as a total image representing the image information of the total field of view, and comprise, along a second image direction, a different dimension as compared to the total image.

2. The device as claimed in claim 1, wherein the first and second optical channels are part of a group of optical channels configured to image one partial field of view of the total field of view, respectively, the group of optical channels being configured to jointly fully image the total field of view.

3. The device as claimed in claim 2, wherein the group of optical channels is configured to capture precisely two partial fields of view.

4. The device as claimed in claim 1, configured to provide the image information of the imaged first and second partial fields of view comprising single-color luminance information.

5. The device as claimed in claim 1, configured to acquire the image information of the total field of view comprising the first degree of scanning, wherein the second degree of scanning is at least 30% larger, along first and second image directions, than the first degree of scanning.

6. The device as claimed in claim 1, wherein the calculating unit is configured to subdivide the image information of the total field of view and the image information of the partial fields of view into image blocks, wherein the calculating unit is configured to associate the first block with the second block while applying an association criterion so as to perform the combination only if the association criterion is met, and to provide the combined image information of the total field of view within the first block without any combination if the association criterion is not met.

7. The device as claimed in claim 1, wherein the calculating unit is configured to perform stitching of the image information of the partial fields of view on the basis of the image information of the total field of view.

8. The device as claimed in claim 1, wherein the calculating unit is configured to generate a depth map for the image information of the total field of view while using a first disparity between an image of the total field of view and an image of the first partial field of view and a second disparity between the image of the total field of view and an image of the second partial field of view.

9. The device as claimed in claim 1, wherein the partial fields of view overlap within an overlap area within the total field of view, the calculating unit being configured to generate a depth map for the image information of the total field of view within the overlap area while using the image information of the first and second partial fields of view.

10. The device as claimed in claim 1, comprising an optical image stabilizer for image stabilization along a first image axis by generating a first relative movement between the image sensor and the array and for image stabilization along a second image axis by generating a second relative movement between the image sensor and the array.

11. The device as claimed in claim 1, further comprising focusing device comprising at least one actuator for adjusting a focus of the device, said actuator being configured to provide a relative movement between at least one optic of one of the optical channels and the image sensor.

12. A supplementation device comprising a device as claimed in claim 1 and configured to be coupled to a camera so as to acquire therefrom the image information of the total field of view.

13. The multi-aperture imaging device as claimed in claim 1, wherein the tolerance range is at most 20%.

14. A multi-aperture imaging device comprising:
an image sensor; and
an array of optical channels, each optical channel comprising an optic for projecting at least one partial field of view of a total field of view onto an image sensor area of the image sensor;
a first optical channel of the array being configured to image a first partial field of view of the total field of view, a second optical channel of the array being configured to image a second partial field of view of the total field of view, and a third optical channel being configured to fully image the total field of view;
wherein the device comprises a calculating unit configured to acquire image information of the first and second partial fields of view on the basis of the imaged partial fields of view, and to acquire image information of the total field of view on the basis of the imaged total field of view, and to combine the image information of the partial fields of view with the image information of the total field of view so as to generate combined image information of the total field of view; and the calculating unit is configured to subdivide the image information of the total field of view and the image information of the partial fields of view into image blocks and to associate, block by block, image information, which is comprised by a first image block of the total field of view, with matching image information of a second image block of the first or second partial fields of view so as to increase, by combining the first and second image blocks, a degree of scanning of the image information of the total field of view in the combined image information; or
wherein the device is configured to acquire image information of the total field of view comprising a first degree of scanning from the sensor, to acquire the image information of the first or second partial field of view comprising a second degree of scanning, which is larger than the first degree of scanning, from the sensor, and to provide the combined image information of the total field of view comprising a third degree of scanning larger than the first degree of scanning;
the multi-aperture imaging device comprising a beam-deflecting device for jointly deflecting an optical path of the first and second optical channels, while an optical path of the third optical channel is directed directly toward the total field of view.

15. The multi-aperture imaging device as claimed in claim 14, wherein an arrangement of optics for capturing the first and second partial fields of view in the array is symmetric in relation to a location of the optic for imaging the total field of view; or
wherein an arrangement of image sensor areas for imaging the first and second partial fields of view is symmetric in relation to a location of the image sensor area for imaging the total field of view.

16. The multi-aperture imaging device as claimed in claim 14, wherein an image format of the total field of view corresponds to a redundancy-free combination of the imaged first partial field of view and the imaged second partial field of view.

17. The multi-aperture imaging device as claimed in claim 14, comprising the calculating unit, and wherein the calculating unit is configured to associate the first block with the second block while applying an association criterion so as to perform the combination only if the association criterion is met, and to provide the combined image information of the total field of view within the first block without any combination if the association criterion is not met.

18. The multi-aperture imaging device as claimed in claim 14, comprising the calculating unit, and wherein the calculating unit is configured to perform stitching of the image information of the partial fields of view on the basis of the image information of the total field of view.

19. The multi-aperture imaging device as claimed in claim 14, comprising the calculating unit, and wherein the calculating unit is configured to generate a depth map for the image information of the total field of view while using a first disparity between an image of the total field of view and an image of the first partial field of view and a second disparity between the image of the total field of view and an image of the second partial field of view.

20. The multi-aperture imaging device as claimed in claim 14, comprising the calculating unit, and wherein the partial fields of view overlap within an overlap area within the total field of view, the calculating unit being configured to generate a depth map for the image information of the total field of view within the overlap area while using the image information of the first and second partial fields of view.

21. The multi-aperture imaging device as claimed in claim 14, configured to acquire the image information of the total field of view comprising the first degree of scanning from the image sensor, wherein the second degree of scanning is at least 30% larger, along first and second image directions, than the first degree of scanning.

22. The multi-aperture imaging device as claimed in claim 14, configured to acquire image information of the total field of view, which is captured by the third optical channel, from the image sensor at a first image resolution, the multi-aperture imaging device comprising display device and being configured to display the image information at the first image resolution at the most.

23. The multi-aperture imaging device as claimed in claim 22, configured to output a video signal of the total field of view on the display device on the basis of consecutive images of the total field of view.

24. The multi-aperture imaging device as claimed in claim 14, comprising beam-deflecting device for shared deflecting of an optical path of the optical channels, and comprising an optical image stabilizer for image stabilization along a first image axis by generating a first relative movement between the image sensor, the array and the beam-deflecting device, and for image stabilization along a second image axis by generating a second relative movement between the image sensor, the array and the beam-deflecting device.

25. The multi-aperture imaging device as claimed in claim 14, wherein the optical image stabilizer is configured to provide a first relative movement for the first and second optical channels and a second relative movement for the third optical channel.

26. The multi-aperture imaging device as claimed in claim 14, wherein the first relative movement comprises at least one of a translational relative movement between the image sensor and the array, a translational relative movement between the image sensor and the beam-deflecting device, and a translational relative movement between the array and the beam-deflecting device, and wherein the second relative movement comprises at least one of a rotational movement of the beam-deflecting device, a translational relative movement between the image sensor and the array, and a translational relative movement between the array and the beam-deflecting device.

27. The multi-aperture imaging device as claimed claim 14, further comprising an electronic image stabilizer for image stabilization of the first optical channel of the array along the first and second image axes.

28. The multi-aperture imaging device as claimed in claim 27, wherein the electronic image stabilizer is configured to stabilize the first optical channel to a first extent along the first and second image axes, and further is configured for image stabilization of the second optical channel to a second extent along the first and second image axes.

29. The multi-aperture imaging device as claimed in claim 27, wherein the optical image stabilizer is configured to perform optical image stabilization such that said optical image stabilization is related to an image of a first one of the partial fields of view, wherein the electronic image stabilizer is configured to stabilize an image of a second partial field of view in relation to the image of the first partial field of view.

30. The multi-aperture imaging device as claimed in claim 27, wherein the optical image stabilizer is configured to stabilize an image of the imaged partial field of view of a reference channel from a group comprising the first optical channel and the second optical channel, and wherein the electronic image stabilizer is configured to perform image stabilization in a channel-specific manner for optical channels which differ from the reference channel, the multi-aperture imaging device being configured to stabilize the reference channel in an exclusively optical manner.

31. The multi-aperture imaging device as claimed in claim 27, wherein the electronic image stabilizer is configured to perform image stabilization for each optical channel in a channel-specific manner.

32. The multi-aperture imaging device as claimed in claim 31, wherein the electronic image stabilizer is configured to perform channel-specific electronic image stabilization in each channel in accordance with a specified functional correlation which depends on the relative movements between the image sensor, the array and the beam-deflecting device.

33. The multi-aperture imaging device as claimed in claim 32, wherein the functional correlation is a linear function.

34. The multi-aperture imaging device as claimed in claim 27, wherein the optical image stabilizer is configured to provide the optical image stabilization along one of the image directions on the basis of a rotational movement of the beam-deflecting device, the functional correlation being an angular function which projects an angle of rotation of the beam-deflecting device onto an extent of the electronic image stabilization along the image direction.

35. The multi-aperture imaging device as claimed in claim 27, wherein the electronic image stabilizer is configured to identify a matching feature in a first partial image of a first partial field of view at a first point in time and at a second point in time, and to provide the electronic image stabilization on the basis of a comparison of movements of the feature in the first image.

36. The multi-aperture imaging device as claimed in claim 27, further comprising focusing device comprising at least one actuator for adjusting a focus of the device, said actuator being configured to provide a relative movement between at least one optic of one of the optical channels and the image sensor.

37. The multi-aperture imaging device as claimed in claim 34, wherein the focusing device is configured to provide a third relative movement for the first and second optical channels and a fourth relative movement for the third optical channel.

38. The multi-aperture imaging device as claimed in claim 14, wherein the image sensor areas are arranged on the image sensor along a line extension direction, and wherein the image sensor areas exhibit, along an image direction perpendicular to the line extension direction, dimensions which are identical within a tolerance range of 20%.

39. The multi-aperture imaging device as claimed in claim 14, wherein the first and second optical channels are part of a group of optical channels configured to image a partial field of view of the total field of view, respectively, said group of optical channels being configured to jointly fully image the total field of view.

40. The multi-aperture imaging device as claimed in claim 38, wherein the group of optical channels is configured to capture precisely two partial fields of view.

41. The multi-aperture imaging device as claimed in claim 14, wherein a first partial image and a second partial image, which represent the image information, provided by the image sensor, of the first and second partial fields of view, comprise a same dimension, along a first image direction, as a total image which represents image information, provided by the image sensor, of the total field of view, and exhibit, along a second image direction, a different dimension as compared to the total image.

42. The multi-aperture imaging device as claimed in claim 14, configured to provide the imaged first and second partial fields of view comprising single-color luminance information.

43. The multi-aperture imaging device as claimed in claim 14, configured as a mobile phone, a smartphone, a tablet, or a monitor.

44. A method of providing a device, comprising:
providing an image sensor;
arranging an array of optical channels, so that each optical channel comprises an optic for projecting at least one partial field of view of a total field of view onto an image sensor area of the image sensor, so that a first optical channel of the array is configured to image a first partial field of view of the total field of view, and so that a second optical channel of the array is configured to image a second partial field of view of the total field of view; and
arranging a calculating unit such that same is configured to acquire image information of the first and second partial fields of view on the basis of the imaged partial fields of view and to acquire image information of the total field of view and to combine the image information of the partial fields of view with the image information of the total field of view so as to generate combined image information of the total field of view; and
such that the device is configured to acquire the image information of the total field of view comprising a first degree of scanning, to acquire the image information of the first or second partial field of view comprising a second degree of scanning, which is larger than the first degree of scanning, and to provide the combined image information of the total field of view comprising a third degree of scanning larger than the first degree of scanning; or
such that the calculating unit is configured to subdivide the image information of the total field of view and the image information of the partial fields of view into image blocks and to associate, block by block, image information, which is comprised by a first image block of the total field of view, with matching image information of a second image block of the first or second partial fields of view so as to increase, by combining the first and second image blocks, a degree of scanning of the image information of the total field of view in the combined image information;
such that a first partial image and a second partial image, which represent the image information of the first and second partial fields of view, comprise, along a first image direction, a same dimension as a total image representing the image information of the total field of view, and comprise, along a second image direction, a different dimension as compared to the total image.

45. A method of providing a multi-aperture imaging device, comprising:
providing an image sensor; and
arranging an array of optical channels, so that each optical channel comprises an optic for projecting at least one partial field of view of a total field of view onto an image sensor area of the image sensor, and so that a first optical channel of the array is configured to image a first partial field of view of the total field of view, so that a second optical channel of the array is configured to image a second partial field of view of the total field of view, and so that a third optical channel is configured to fully image the total field of view;
such that the device comprises a calculating unit configured to acquire image information of the first and second partial fields of view on the basis of the imaged partial fields of view, and to acquire image information of the total field of view on the basis of the imaged total field of view, and to combine the image information of the partial fields of view with the image information of the total field of view so as to generate combined image information of the total field of view; and the calculating unit is configured to subdivide the image information of the total field of view and the image information of the partial fields of view into image blocks and to associate, block by block, image information, which is comprised by a first image block of the total field of view, with matching image information of a second image block of the first or second partial fields of view so as to increase, by combining the first and second image blocks, a degree of scanning of the image information of the total field of view in the combined image information; or
such that the device is configured to acquire image information of the total field of view comprising a first degree of scanning from the sensor, to acquire the image information of the first or second partial field of view comprising a second degree of scanning, which is larger than the first degree of scanning, from the sensor, and to provide the combined image information of the total field of view comprising a third degree of scanning larger than the first degree of scanning;

such that the device comprises a beam-deflecting device for jointly deflecting an optical path of the first and second optical channels, while an optical path of the third optical channel is directed directly toward the total field of view.

46. A supplementation device comprising a device, the device comprising:

an image sensor;

an array of optical channels, each optical channel comprising an optic for projecting a partial field of view of a total field of view onto an image sensor area of the image sensor, a first optical channel of the array being configured to image a first partial field of view of the total field of view, and a second optical channel of the array being configured to image a second partial field of view of the total field of view; and a calculating unit configured to acquire image information of the first and second partial fields of view on the basis of the imaged partial fields of view, and to acquire image information of the total field of view, and to combine the image information of the partial fields of view with the image information of the total field of view so as to generate combined image information of the total field of view;

wherein the device is configured to acquire the image information of the total field of view comprising a first degree of scanning, to acquire the image information of the first or second partial field of view comprising a second degree of scanning, which is larger than the first degree of scanning, and to provide the combined image information of the total field of view comprising a third degree of scanning larger than the first degree of scanning; or wherein the calculating unit is configured to subdivide the image information of the total field of view and the image information of the partial fields of view into image blocks and to associate, block by block, image information, which is comprised by a first image block of the total field of view, with matching image information of a second image block of the first or second partial fields of view so as to increase, by combining the first and second image blocks, a degree of scanning of the image information of the total field of view in the combined image information;

wherein the supplementation device is configured to be coupled to a camera, the camera being an apparatus different from the supplementation device so as to acquire therefrom the image information of the total field of view.

47. A multi-aperture imaging device comprising:

an image sensor; and an array of optical channels, each optical channel comprising an optic for projecting at least one partial field of view of a total field of view onto an image sensor area of the image sensor;

a first optical channel of the array being configured to image a first partial field of view of the total field of view, a second optical channel of the array being configured to image a second partial field of view of the total field of view, and a third optical channel being configured to fully image the total field of view;

wherein the device comprises a calculating unit configured to acquire image information of the first and second partial fields of view on the basis of the imaged partial fields of view, and to acquire image information of the total field of view on the basis of the imaged total field of view, and to combine the image information of the partial fields of view with the image information of the total field of view so as to generate combined image information of the total field of view; and the calculating unit is configured to subdivide the image information of the total field of view and the image information of the partial fields of view into image blocks and to associate, block by block, image information, which is comprised by a first image block of the total field of view, with matching image information of a second image block of the first or second partial fields of view so as to increase, by combining the first and second image blocks, a degree of scanning of the image information of the total field of view in the combined image information; or wherein the device is configured to acquire image information of the total field of view comprising a first degree of scanning from the sensor, to acquire the image information of the first or second partial field of view comprising a second degree of scanning, which is larger than the first degree of scanning, from the sensor, and to provide the combined image information of the total field of view comprising a third degree of scanning larger than the first degree of scanning;

the multi-aperture imaging device comprising a beam-deflecting device for shared deflecting of an optical path of the optical channels, and comprising an optical image stabilizer for image stabilization along a first image axis by generating a first relative movement between the image sensor, the array and the beam-deflecting device, and for image stabilization along a second image axis by generating a second relative movement between the image sensor, the array and the beam-deflecting device.

* * * * *